US007789743B2

(12) United States Patent
Walker et al.

(10) Patent No.: US 7,789,743 B2
(45) Date of Patent: Sep. 7, 2010

(54) METHOD AND APPARATUS FOR FACILITATING PLAY OF GAMING DEVICE

(75) Inventors: Jay S. Walker, Ridgefield, CT (US); James A. Jorasch, Stamford, CT (US); Stephen C. Tulley, Fairfield, CT (US); Geoffrey M. Gelman, Stamford, CT (US)

(73) Assignee: IGT, Reno, NV (US)

(*) Notice: Subject to any disclaimer, the term of this patent is extended or adjusted under 35 U.S.C. 154(b) by 615 days.

(21) Appl. No.: 10/298,621

(22) Filed: Nov. 15, 2002

(65) Prior Publication Data

US 2003/0100357 A1 May 29, 2003

Related U.S. Application Data

(60) Provisional application No. 60/336,260, filed on Nov. 15, 2001.

(51) Int. Cl.
*A63F 13/00* (2006.01)

(52) U.S. Cl. ............................. 463/16; 463/25; 463/20

(58) Field of Classification Search ............. 463/11–13, 463/16, 20–22, 42, 17, 18, 19, 30–33, 23
See application file for complete search history.

(56) References Cited

U.S. PATENT DOCUMENTS

| | | | | |
|---|---|---|---|---|
| 4,743,022 | A | 5/1988 | Wood | 273/85 CP |
| 5,118,109 | A | 6/1992 | Gumina | 273/139 |
| 5,322,295 | A | 6/1994 | Cabot et al. | 273/292 |
| 5,377,973 | A | 1/1995 | Jones et al. | 273/85 CP |
| 5,401,023 | A | 3/1995 | Wood | 273/85 CP |
| 5,407,199 | A | 4/1995 | Gumina | 273/139 |
| 5,411,257 | A | 5/1995 | Fulton | 273/85 CP |
| 5,531,441 | A | 7/1996 | Dabrowski et al. | 463/12 |
| 5,630,753 | A * | 5/1997 | Fuchs | 463/9 |
| 5,823,873 | A | 10/1998 | Moody | 463/13 |
| 5,855,514 | A * | 1/1999 | Kamille | 463/17 |
| 5,868,619 | A * | 2/1999 | Wood et al. | 463/13 |
| 6,001,016 | A * | 12/1999 | Walker et al. | 463/42 |
| 6,045,129 | A | 4/2000 | Cooper et al. | 273/292 |
| 6,050,568 | A * | 4/2000 | Hachquet | 273/292 |
| 6,098,985 | A * | 8/2000 | Moody | 273/292 |
| 6,135,883 | A | 10/2000 | Hachquet | 463/13 |
| 6,159,097 | A * | 12/2000 | Gura | 463/20 |
| 6,270,405 | B1 | 8/2001 | Ferguson | 463/13 |
| 6,334,613 | B1 | 1/2002 | Yoseloff | 273/292 |
| 6,390,473 | B1 * | 5/2002 | Vancura et al. | 273/292 |
| 6,474,645 | B2 * | 11/2002 | Tarantino | 273/274 |

(Continued)

OTHER PUBLICATIONS

Brochure: "Double Play Black Jack", PDS Gaming, undated.

(Continued)

*Primary Examiner*—Ronald Laneau
*Assistant Examiner*—Ross A. Williams
(74) *Attorney, Agent, or Firm*—K&L Gates LLP

(57) ABSTRACT

A method in accordance with one or more embodiments of the present invention is provided, the method comprising the steps of receiving a wager, determining an intermediate outcome of a game of chance, determining a first option for play, determining a first final outcome based on the intermediate outcome and the first option for play, determining a second option for play, and determining a second final outcome based on the intermediate outcome and the second option for play.

6 Claims, 23 Drawing Sheets

U.S. PATENT DOCUMENTS

| | | | | |
|---|---|---|---|---|
| 6,517,074 | B1 | 2/2003 | Moody et al. | |
| 6,568,680 | B1 * | 5/2003 | Moody et al. | 273/292 |
| 6,708,975 | B1 * | 3/2004 | Fox et al. | 273/292 |
| 2002/0193099 | A1 * | 12/2002 | Paulsen | 455/414 |
| 2003/0069068 | A1 * | 4/2003 | Kaminkow | 463/25 |
| 2003/0164590 | A1 | 9/2003 | Moody | |

OTHER PUBLICATIONS

Website: "Blackjacks Online Casino—Paigow Poker", (http //www blackjacksonlinecasino com/paigow html), download date: Sep. 7, 2001.

Website: "Hustler How-To For Lowball", (http //www hustlergaming com/lowNoFlash html), download date: Oct. 4, 2001.

Website: "Wireplay Poker", (http www wireplay com au/scripts/ Games asp?GameID2=56&I=2), download date: Oct. 4, 2001.

Website: "Pick'em Video Poker", Video Poker 1, (http //www videopoker1 com), copyright 2002.

Smolen, Don, "CPOKER", (http //conjelco com/software html), download date: Feb. 14, 2003.

Website: "Rules of the Game—3.4 Splitting Pairs", (http //www blackjackinfo com/bjrules htm), download date: Feb. 14, 2003.

Website: "Rules of the Game—3.1 Surrender", (http //www blackjackinfo com/bjrules htm), download date: Feb. 14, 2003.

* cited by examiner

400

| PLAYER IDENTIFIER 402 | NAME 404 | FINANCIAL ACCOUNT IDENTIFIER 406 | HOME ADDRESS 408 | EMAIL ADDRESS 410 | DEMOGRAPHIC 412 |
|---|---|---|---|---|---|
| P11123 | SAM BROWN | 1111-1111-1111-1111 | ANYPLACE, USA | SBROWN@RAIN.COM | MALE, AGE 23 |
| P22234 | LINDA JONES | 2222-2222-2222-2222 | SOMEPLACE, USA | LJONES@SHINE.COM | FEMALE, AGE 47 |
| P33345 | MARGIE SMITH | 3333-3333-3333-3333 | ANYWHERE, USA | MARGE@EAST.COM | FEMALE, AGE 65 |

| PREFERRED PLAY OPTION 414 | PREFERRED TARGET OUTCOME(S) 416 | HISTORICAL THEORETICAL WIN 418 |
|---|---|---|
| HIGHEST EXPECTED PAYOUT | A(h), K(h), Q(h), J(h), 10(h); "HIGH" HANDS | $2,345 |
| ALWAYS TAKE A SURE WIN; ALLOCATE 50% TO HOLDING A LONE ACE AND THE OTHER 50% TO DRAWING FIVE NEW CARDS | "LOW" HANDS; STRAIGHTS | $765 |
| ALWAYS DRAW ONE OR TWO CARDS TO A ROYAL-STRAIGHT-FLUSH | THREE-OF-A-KIND | $682 |

FIG. 4

500

| DRAW COMBINATION 502 | EXPECTED PAYOUT 510 |
|---|---|
| ROYAL-FLUSH | 800 |
| STRAIGHT-FLUSH | 50 |
| FOUR-OF-A-KIND | 25 |
| 4 CARDS TO A ROYAL-FLUSH | 18.70 |
| QUEEN-TEN SUITED | 0.48 |
| ACE | 0.47 |

FIG. 5

600

| SESSION IDENTIFIER: S1234 602 | | | | | | | |
|---|---|---|---|---|---|---|---|
| PLAYER IDENTIFIER: P777777 604 | | | | | | | |
| DATE: 09/24/2004 606 | | | | | | | |
| HANDLE PULL IDENTIFIER 608 | WAGER 610 | INTERMEDIATE OUTCOME 612 | FIRST DRAW COMBINATION 614 | SECOND DRAW COMBINATION 616 | THIRD DRAW COMBINATION 618 | TARGET OUTCOME(S) 620 | WAGER ALLOCATION 622 |
| 1 | $1 | A(h) 10(d) 7(d) 5(h) 2(C) | A(h) | N/A | N/A | N/A | 100 |
| 2 | $1 | Q(s) Q(d) J(d) 9(d) 4(h) | Q(s) Q(d) | Q(d) J(d) 9(d) | N/A | 3-OF-A-KIND OR BETTER; N/A | 60-40 |
| 3 | $5 | K(h) Q(h) J(h) J(s) 8(h) | J(h) J(s) | K(h) Q(h) J(h) | K(h) Q(h) J(h) 8(h) | N/A | 30-40-30 |
| 100 | $1 | Q(c) 10(d) 7(h) 4(d) 2(c) | Q(c) | NONE | N/A | "HIGH"; "LOW" | 50-50 |

FIG. 6

METHOD AND APPARATUS FOR FACILITATING PLAY OF GAMING DEVICE

This application claims the benefit of priority of U.S. Provisional Patent Application Ser. No. 60/336,260, filed Nov. 15, 2001, the contents of which are incorporated by reference herein for all purposes.

CROSS-REFERENCE TO RELATED APPLICATIONS

This application is related to the following co-pending applications:

(i) U.S. patent application Ser. No. 10/205,305, filed Jul. 24, 2002; and also (ii) U.S. patent application Ser. No. 10/202,192, filed Jul. 23, 2002; which is a continuation-in-part of U.S. patent application Ser. No. 09/109,839, filed Jul. 2, 1998, and issued on Jul. 23, 2002 as U.S. Pat. No. 6,422,940;

the contents of each of which are incorporated by reference herein for all purposes.

FIELD OF THE INVENTION

The present invention relates to game playing apparatus and methods.

BACKGROUND OF THE INVENTION

Game playing may be based on skill and/or based on chance. In games of chance, a player typically places a wager on one or more games, and receives a payout (which may be zero) based on the outcome of the game and/or the wager. Games of chance may occur via various devices, may be conducted without a device. Examples of devices for games of chance include, without limitation, video poker machines, video blackjack machines, mechanical slot machines, and video slot machines.

BRIEF DESCRIPTION OF THE DRAWINGS

FIG. 4 is a table illustrating an example data structure of an example player database 208 as depicted in FIG. 2 for use in some embodiments of the present invention.

FIG. 5 is a table illustrating an example data structure of an example draw combination database 318 as depicted in FIG. 3 for use in some embodiments of the present invention.

FIG. 6 is a table illustrating an example data structure of an example session database 320 as depicted in FIG. 3 for use in some embodiments of the present invention.

DETAILED DESCRIPTION OF THE INVENTION

Figure 1:
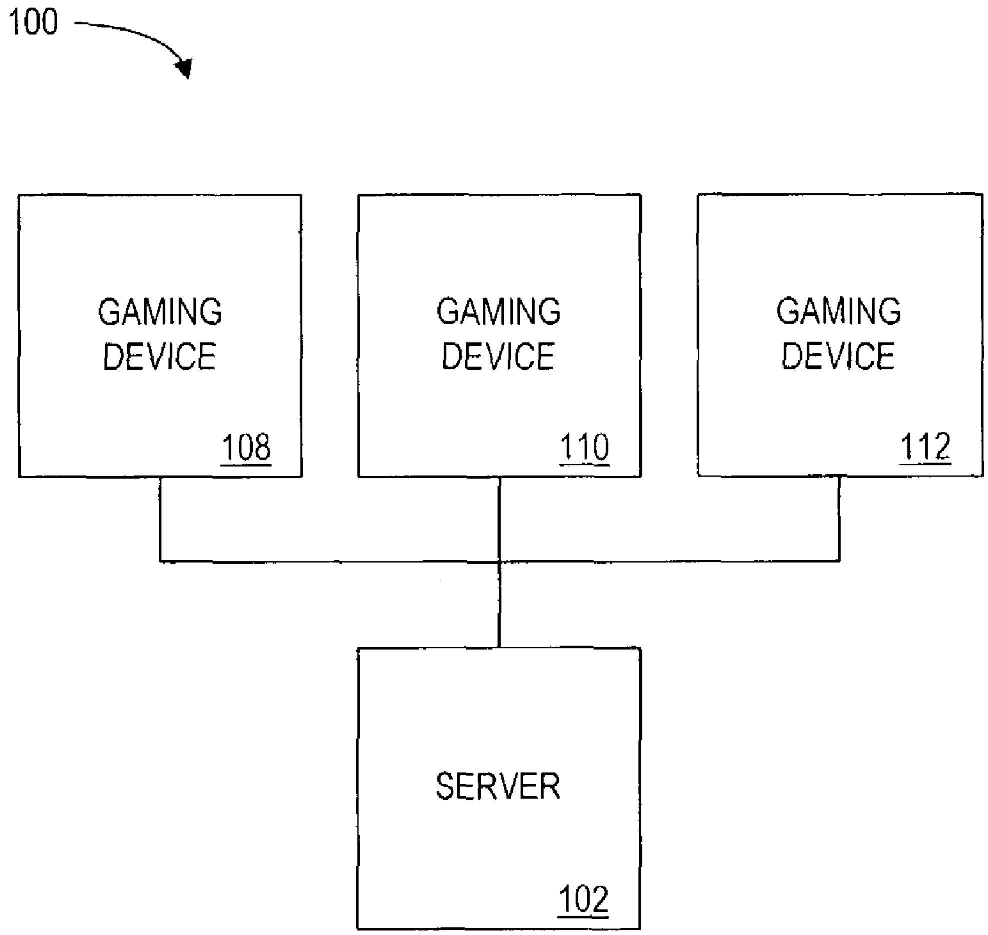
FIG. 1 is a block diagram illustrating an example system according to some embodiments of the present invention.

Several games require a player to make a decision or select an available option that may influence the final outcome of the game. Such games include, without limitation, poker, blackjack, pai gow poker, and casino war. For example, in a typical draw poker game, play begins when the player is dealt an initial five-card hand. The player then chooses which of the five cards to discard (or which of the five cards to hold). The chosen discards are replaced with new cards, and the resulting hand is then categorized as a winning or losing outcome. In blackjack, a player begins with a two-card hand, and must then make decisions such as whether to hit, stand, double down, surrender, etc. In pai gow poker, a player begins with a seven-card hand and must decide how to split his initial hand of seven cards into a five-card hand and a two-card hand. In casino war, a player must periodically decide whether to go to war, or whether to surrender an initial bet.

Applicants have recognized that many different types of players, when faced with a decision in a game, are unsure of what to do. Even after choosing one course of action, some players may wonder what would have happened had another option been pursued. Thus, some players would find it appealing to be able to pursue more than one option or strategy in a game from the same decision point. Some types of players would find it appealing to be able to pursue one course of action with respect to an intermediate result in a game in order to achieve a final result, and then be able to pursue a second course of action with respect to the same intermediate result in order to achieve another final result based on the second course of action.

Applicants have also recognized that some types of players would like to be provided with information about one or more options available during play of a game. For example, some players would like to receive information about possible ways to play an initial hand of poker. Further, some players would like to be provided with information about available strategies or options. Some players, therefore, would find it appealing to be provided with information about an available strategy that indicates how the strategy is carried out (e.g., what poker cards to hold, what cards to use to create a two-card hand in pai gow poker), information about what final outcomes may result from an available strategy (e.g., what final poker hands could result), information about an expected return for an available strategy, and/or information about a payout that may result from an available strategy.

Some players may also like to be able to execute a desired strategy faster or more easily. For example, some players would like to be able to hold certain cards of an initial poker hand and receive a final hand, or to designate certain cards of an initial pai gow hand to a second hand, without identifying one or more of the cards individually. Thus, some players would find it appealing to be able to identify a desired option for play, such as by selecting an option represented on a display of a gaming device, and to have the gaming device facilitate the processing of any cards or other game symbols affected by the identified option or strategy.

Applicants have also recognized that some types of players, when given the opportunity to pursue more than one option for play of a game from some intermediate decision point, would like to be able to allocate a respective portion of an initial wager to each option or strategy they would like to pursue. For example, some players would like to be able to evaluate an intermediate outcome and then allocate the same or different amounts of an initial wager to different strategies.

One or more embodiments of the present invention overcome drawbacks of the prior art by allowing a game player to follow more than one course of action at a decision point in a game. For example, after a video poker player receives an initial five-card hand, the player may follow two different draw strategies to their respective conclusions. In a first strategy, the player might hold only the first and second cards, discarding the others. In a second strategy, he might hold only the second, third, and fourth cards. The player may then be paid based on the outcome of his first strategy and the outcome of his second strategy. A player who cannot make up his mind between two courses of action, or who chooses one course of action and then would like to see what happens following a second course of action, benefits from being able to follow both options or strategies for play.

According to some embodiments of the present invention, a user places an initial wager and receives an intermediate outcome. The outcome might be a poker hand, a blackjack hand, a pai gow hand, or some other outcome. The gaming device then provides the player with means for choosing one or more strategies or options to play the intermediate outcome. For example, the gaming device might replicate a hand of video poker several times, so that the player can choose different combinations of discards from every hand. Alternatively, the gaming device might present the user with text descriptions of various strategies. The user may then touch the screen of the gaming device to indicate one or more strategies he would like to pursue.

Once the player has chosen one or more strategies, in some embodiments the player may designate an amount of the initial wager to allocate to each strategy. According to one embodiment, the player must distribute the amount of the original wager amongst all the strategies. For example, if a player has made an initial wager of $1, then $0.25 might go to a first strategy, and $0.75 to a second. The gaming device generates a final outcome for each selected strategy. The player is then paid according to each outcome. In some embodiments, the payout amount corresponding to a particular final outcome is also based on how much of the initial wager was allocated to the strategy that resulted in that final outcome.

With these and other advantages and features of the invention that will become hereinafter apparent, the nature of the invention may be more clearly understood by reference to the following detailed description of the invention, to the appended claims and to the several drawings included herein.

In the following description, reference is made to the accompanying drawings that form a part hereof, and in which is shown, by way of illustration, specific embodiments in which the invention may be practiced. These embodiments are described in sufficient detail to enable those skilled in the art to practice the invention. The exemplary embodiments described herein, however, should not to be taken in a limiting sense. It will be understood, for example, that other embodiments may be utilized and that structural, logical, software, and electrical changes may be made without departing from the scope of the present invention.

1. System

Referring now to FIG. 1, a system 100 according to one or more embodiments of the present invention includes server 102 that is in communication with gaming devices 108, 110 and 112. Any of the server 102 and the gaming devices 108, 110 and 112 may comprise one or more computing devices, such as those based on the INTEL® PENTIUM® processor, adapted to communicate with one another. Any or all of the server 102 and/or the gaming devices 108, 110 and 112 may include (or be a part of), without limitation: a point-of-sale (POS) terminal; a telephone, such as a mobile telephone, a cellular telephone, a wireless telephone, or a telephonically-enabled data organizer; an interactive voice response (IVR) system, such as the ML400-IVR designed by MISSING LINK INTERACTIVE VOICE RESPONSE SYSTEMS; a vending machine; a pager; a gaming device, including a slot machines; a personal computer, such as a desktop computer; a portable type of computer, such as a laptop computer, a wearable computer, a palm-top computer, or a hand-held computer; a smart card; and a Personal Digital Assistant ("PDA"). Other equivalent devices capable of performing the methods specified herein are well known in the art.

Any number of gaming devices may be in communication with the server 102. The number of each depicted in FIG. 1 is solely for purposes of illustration The server 102 may communicate with the gaming devices directly or via a network, including, without limitation, the Internet, wireless network protocol, local area network, or a combination thereof; through a Web site maintained by the server 102 on a remote server; or over an on-line data network including, without limitation, commercial on-line service providers and bulletin board systems. The server 102 may communicate with the gaming devices directly or indirectly. In some embodiments, the devices may communicate with the server 102 over RF, cable TV, satellite links and the like.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

The server 102 may function as a "Web server" that generates Web pages (documents on the Web that typically include an HTML file and associated graphics and script files) that may be accessed via the Web and allows communication with the server 102 in a manner known in the art.

The server 102 may be a casino server, such as may be associated with, controller by, and/or operated on behalf of a casino or other gaming establishment.

FIG. 1 depicts only an embodiment of the invention. Other arrangements of devices to perform various methods specified herein will be readily appreciated by those of skill in the art.

2. Devices

Figure 2:
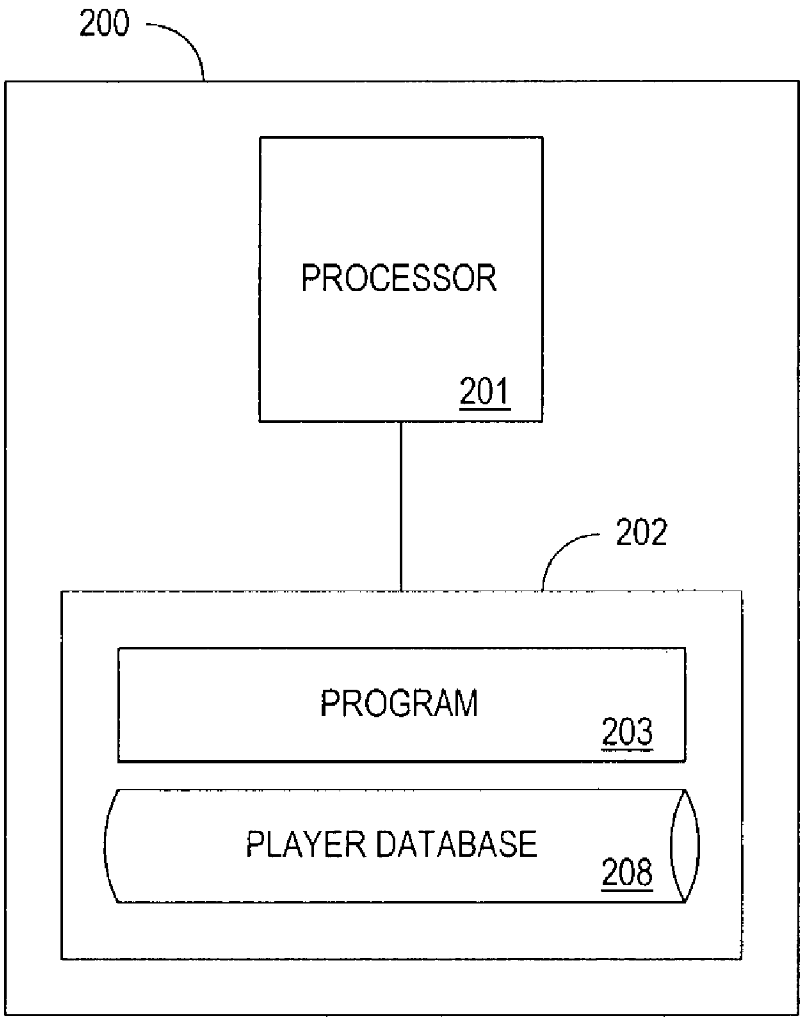
FIG. 2 is a block diagram illustrating an example of a server 102 as depicted in FIG. 1 according to some embodiments of the present invention.

FIG. 2 illustrates an embodiment of the server 102. The casino server 200 may be implemented as a system controller, a dedicated hardware circuit, an appropriately programmed general-purpose computer, or any other appropriate device including, without limitation, electronic, mechanical or electro-mechanical devices.

The casino server 200 of the illustrated embodiment comprises a processor 201, such as one or more INTEL® PENTIUM® microprocessors. The processor 201 is in communication with a data storage device 202. The data storage device 202 comprises magnetic memory, optical memory, semiconductor memory or any combination thereof. The data storage device 202 may include, for example, Random Access Memory (RAM), Read-Only Memory (ROM), a compact disc and/or a hard disk. The processor 201 and the storage device 202 may each be, for example: (i) located entirely within a single computer or computing device; or (ii) connected to each other by a remote communication medium including, without limitation, a serial port cable, a telephone line, a network connection or a radio frequency transceiver. In some embodiments, the server 102 may comprise one or more computers that are connected to a remote server computer for maintaining databases.

The data storage device 202 stores a program 203 for controlling the processor 201. The processor 201 performs instructions of the program 203, and thereby operates in accordance with the present invention, and particularly in accordance with the methods described in detail herein. The program 203 may be stored in a compressed, uncompiled and/or encrypted format, as well as in a variety of other forms known in the art. In some embodiments, computer program 203 is developed using an object oriented language that allows the modeling of complex systems with modular objects to create abstractions that are representative of real world, physical objects and their interrelationships. However, it would be understood by one of ordinary skill in the art that the invention as described herein could be implemented in many different ways using a wide range of programming techniques as well as general-purpose hardware systems or dedicated controllers.

The program 203 furthermore includes program elements that may be necessary or generally useful, including, without limitation: an operating system, a database management system, and device drivers for facilitating the interface of the processor 201 with one or more peripheral devices. Appropriate program elements are well known to those skilled in the art, and need not be described in detail herein.

Further, the program 203 is preferably operative to execute a number of objects, modules and/or subroutines which may include (but are not limited to): one or more routines to identify a player at a gaming device 108, 110 and 112; one or more routines to receive information about a user; one or more routines to establish, determine, generate, and/or receive from a user information about one or more options or strategies for play of a game; one or more routines to establish, determine, generate, display to a user, transmit to a user, and/or provide to a user at a gaming device 108, 110 and 112 information about one or more options or strategies for play of a game; one or more routines to determine and/or receive information about an allocation of a wager among a plurality of final outcomes desired by a user at a gaming device 108, 110 and 112; and/or one or more routines to control databases or software objects that track information regarding users, casinos, gambling results, group data, gaming devices 108, 110 and 112; and/or one or more routines for awarding payouts. Examples of some of these routines and their operation are described in detail below in conjunction with the flowchart depicted in FIG. 12.

According to an embodiment of the present invention, the instructions of the program 203 may be read into a main memory from another computer-readable medium, such as into RAM from a hard drive or ROM. Execution of sequences of the instructions in program 203 causes processor 201 to perform process steps described herein. In alternative embodiments, hard-wired circuitry may be used in place of, or in combination with, software instructions for implementation of one or more processes of the present invention, as would be understood by those of skill in the art. Thus, embodiments of the present invention are not limited to hardware, software or any specific combination of hardware and software.

The storage device 202 also preferably stores a player database 208, one exemplary embodiment of which is described in detail below.

Figure 3:
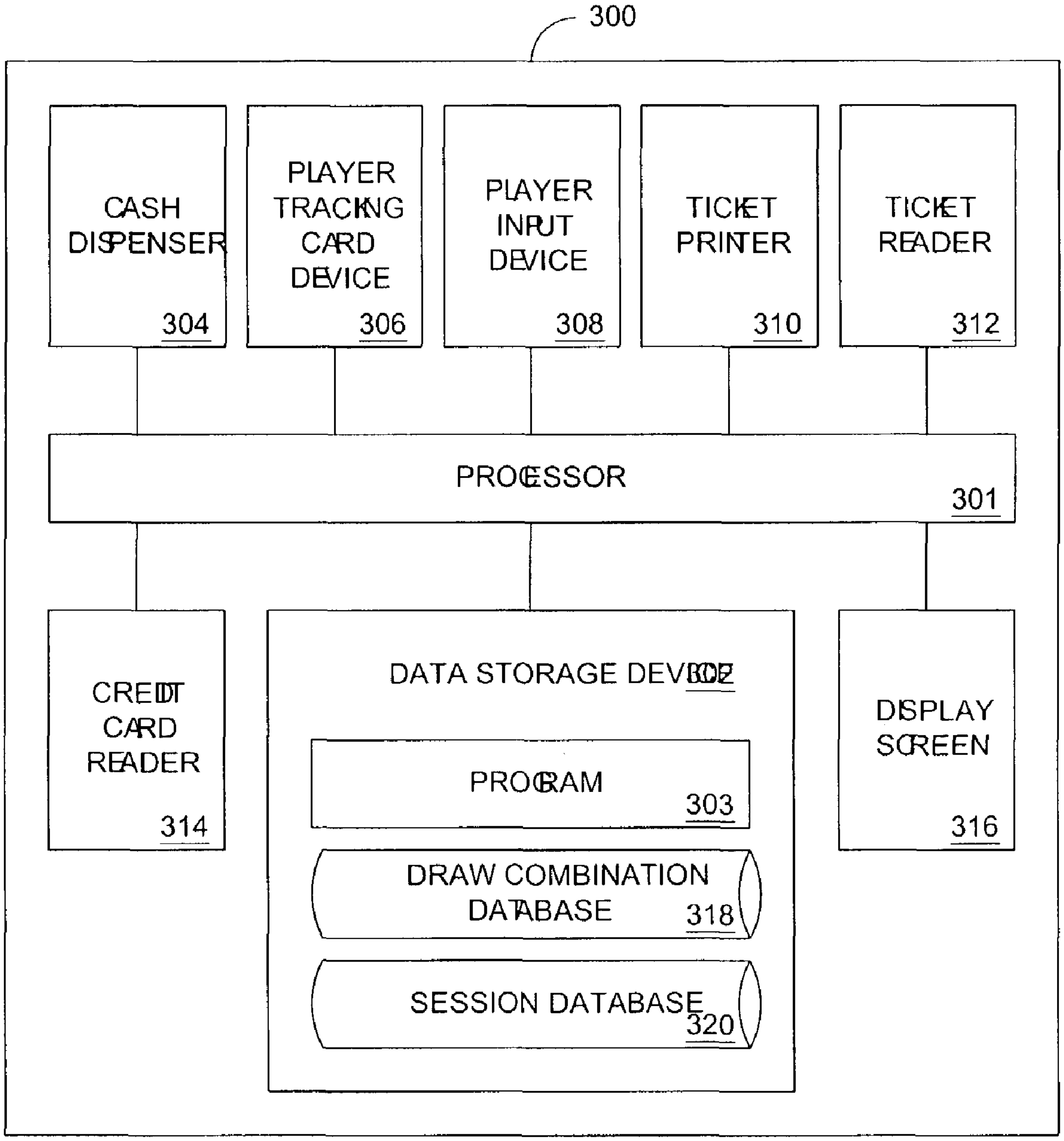
FIG. 3 is a block diagram illustrating an example of a gaming device 108 as depicted in FIG. 1 according to some embodiments of the present invention.

FIG. 3 illustrates an embodiment of a gaming device. Well-known examples of gaming devices include, without limitation, slot machines. Well-known examples of slot machines include, without limitation, video poker machines, video blackjack machines, mechanical slot machines, video slot machines, video keno machines, video bingo machines, pachinko machines, and video lottery terminals. The gaming device may be implemented as a dedicated hardware circuit, an appropriately programmed general-purpose computer, or any other appropriate device including, without limitation, electronic, mechanical or electro-mechanical devices. Accordingly, the gaming device need not include the various exemplary components depicted in FIG. 3.

The gaming device 300 of the illustrated embodiment comprises a processor 301, such as one or more INTEL® PENTIUM® microprocessors. The processor 301 is in communication with a data storage device 302. The data storage device 302 comprises magnetic memory, optical memory, semiconductor memory or any combination thereof. The data storage device 302 may include, for example, Random Access Memory (RAM), Read-Only Memory (ROM), a compact disc and/or a hard disk. The processor 301 and the storage device 302 may each be, for example: (i) located entirely within a single computer or computing device; or (ii) connected to each other by a remote communication medium, including, without limitation, a serial port cable, a telephone line, a network connection or a radio frequency transceiver. In some embodiments, the gaming device may comprise one or more computers that are connected to a remote server computer for maintaining databases.

The data storage device 302 stores a program 303 for controlling the processor 301. The processor 301 performs instructions of the program 303, and thereby operates in accordance with the present invention, and particularly in accordance with the methods described in detail herein. The program 303 may be stored in a compressed, uncompiled and/or encrypted format, as well as in a variety of other forms known in the art. The program 303 furthermore includes program elements that may be necessary, including, without limitation, an operating system, a database management system and "device drivers" for allowing the processor 301 to interface with one or more peripheral devices. Appropriate program elements are well known to those skilled in the art, and need not be described in detail herein.

According to an embodiment of the present invention, the instructions of the program 303 may be read into a main memory from another computer-readable medium, such as into RAM from a hard drive or ROM. Execution of sequences of the instructions in program 303 causes processor 301 to perform process steps described herein. In alternative embodiments, hard-wired circuitry may be used in place of, or in combination with, software instructions for implementation of the processes of the present invention, as would be understood by those of skill in the art. Thus, embodiments of the present invention are not limited to hardware, software or any specific combination of hardware and software.

The storage device 302 also preferably stores a draw combination database 318 and a session database 320, exemplary embodiments of which are described in detail below.

The processor 301 may also be in communication with a cash dispenser 304, which dispenses coins and/or bills to players that have requested to have funds be dispensed. In another example, the cash dispenser 304 may dispense bills and/or tokens without a request by a player to have funds be dispensed (e.g., may dispense automatically in response to a signal from the processor 301).

The processor 301 may also be in communication with a player tracking card device 306, which preferably performs functions related to player tracking cards, such as reading player tracking cards and communicating information read from such cards to the processor 301. Typically, information read from such cards includes unique player identifiers, such as a sequence of digits or a sequence of alphanumeric characters.

The processor 301 may also be in communication with a player input device 308, which receives input from the player. Input device 308 may comprise a variety of devices, including, without limitation, one or more buttons, touch screens, handles, keypads, pointer devices (e.g., a mouse, a trackball), microphones or any combination of the above.

The processor 301 may also be in communication with a printer 310, which may be commanded to print onto a substrate, such as paper or other material. Printing may be via ink jet, laser printing or other methodology for registering indicia on a substrate. Alternatively, the substrate may be registered with indicia by deforming the substrate in a variety of ways known in the art, including, without limitation, punching holes in the substrate and raising and/or lowering portions of the substrate relative to other portions. The printer 310 may be used for printing, e.g., receipts, coupons, or tickets.

The processor 301 may also be in communication with a ticket reader 312, which is capable of reading, for example, receipts, coupons and/or tickets, and particularly indicia registered on any such substrates. The ticket reader 312 may use optical sensing of printed indicia, for example, and optical character recognition to read indicia from a ticket inserted in the ticket reader 312.

The processor 301 may also be in communication with a credit card reader 314. Such devices are known in the art, and generally allow a card such as a credit card or debit card to be inserted therewithin. The card may include a magnetic stripe or other form of data storage, which the credit card reader 314 is capable of sensing and interpreting. Typically, the credit card reader allows a credit card transaction to be processed by communication with a credit card clearinghouse in a manner known in the art.

The processor 301 may also be in communication with a display screen 316, which displays images in a manner known in the art. Typical display screens include, without limitation, liquid crystal displays, plasma displays and video display monitors.

3. Databases

Any databases noted above are described in detail below and depicted with exemplary entries in the accompanying figures. As will be understood by those skilled in the art, the schematic illustrations and accompanying descriptions of the databases presented herein are exemplary arrangements for stored representations of information. A number of other arrangements may be employed besides those suggested by the tables shown. For example, those skilled in the art will understand that the number and/or content of the databases can be different from those illustrated herein. The exemplary information of two or more described databases alternatively may be included in one database. Further, the exemplary information of one described database alternatively may be included in more than one database. Similarly, the illustrated entries of the databases represent exemplary information only; those skilled in the art will understand that the number and/or content of the entries can be different from those illustrated herein. Based on the present disclosure many other arrangements of data will be readily understood by those of skill in the art. Further, despite the exemplary depiction of the databases as tables, it will be understood that an object-based model could be used to store and manipulate various data types of the present invention, and appropriate object methods or behaviors could be used to implement various processes of the present invention.

3.1. Player Database

FIG. 4 is a tabular representation 400 of the player database 208 of FIG. 2. The tabular representation 400 of the player database 208 includes a number of example records or entries, each indicating a player. Those skilled in the art will understand that the player database 208 may include any number of entries. The tabular representation 400 also defines fields for each of the entries or records. The fields specify: (i)

a player identifier 402 that uniquely identifies the player, such as a player tracking card number; (ii) a player name 404; (iii) a financial account identifier 406 of the player, which may represent, for example, a credit card account, a debit card account and other financial accounts; (iv) a home address 408 of the player; (v) an email address 410 of the player; (vi) a demographic 412 of the player, which may indicate, for example, the gender, age, residence, income and/or occupation of the player; (vii) a preferred play option 414 of the player, which provides an indication of one or more options for play, instructions, draw combinations, and/or strategies, which the player prefers to use during play of a game, and which may or may not be based on or associated with a primary, intermediate, or initial outcome; (viii) preferred target outcome(s) 416 of the player, which provides an indication of one or more outcomes (or one or more sets of outcomes) that the player prefers to achieve; and (ix) a historical theoretical win 418 of the player, based on, for example, the number and types of games the player has played.

Not all of the fields depicted in FIG. 4 are required, and various substitutions, deletions and other changes to the tabular representation will be readily apparent to those of ordinary skill in the art. For example, the preferred target outcome is not needed in many embodiments. The depicted fields, for example, the demographic information, are for illustration only. Various other forms of demographic information are described herein and still others will be readily apparent to those of skill in the art.

3.2. Draw Combination Database

FIG. 5 is a tabular representation 500 of the draw combination database 318 of FIG. 3. The tabular representation 500 of the draw combination database 318 includes entries indicating information about exemplary expected payouts that are associated with exemplary draw combinations, such as for a video poker game. Those skilled in the art will understand that the draw combination database 318 may include any number of entries. The tabular representation 500 also defines fields for the entries or records. The fields specify: (i) a draw combination 502 that includes a representation of a set of one or more cards of a hand to be held; and (ii) an expected payout 510 that includes a representation of a payout that the player could theoretically expect if the draw combination 502 is used.

Not all of the fields depicted in FIG. 5 are required, and various substitutions, deletions and other changes to the tabular representation will be readily apparent to those of ordinary skill in the art. The depicted fields, for example the primary, target, and current outcomes, are for illustration only. Various other types and/or representations of outcomes are described herein and still others will be readily apparent to those of skill in the art.

Some of the representations of the draw combinations 502 are depicted in FIG. 5 in terms of a general category of a set of one or more card combinations (e.g., "ACE"). Draw combinations may alternatively be represented as specific sets of cards. For example, all of the "ACE" draw combinations could be represented individually with one or more entries of "ACE OF HEARTS," "ACE OF DIAMONDS," "ACE OF SPADES," and "ACE OF CLUBS." Similarly, the specific cards that comprise the one or more combinations could indicate one or more combinations of "4 CARDS TO A ROYAL-FLUSH".

Although the draw combinations 502 depicted in FIG. 5 as defining a set of one or more cards to be held (e.g., in an initial hand of cards), it will be understood that a draw combination may alternatively refer to a set of cards to be discarded. In some embodiments, a draw combination may refer to both a set of cards to be held and a set of cards to be discarded. Also, draw combinations need not indicate a specific rank (e.g., "ACE") or suit (e.g., "HEART") of a card. In some embodiments, for example, a draw combination may refer to a card by its position (e.g., in a displayed hand, in a generated deck, in an order dealt).

The representation of the values for expected payout amounts 510 are depicted in FIG. 5 in terms of a number of coins. Payout amounts may alternatively be represented as a variable 'X'. In other words, the ratio of values for any two payout amounts may be a constant. Many other representations are possible. For example, the expected payout 510 may include for each respective payout a dollar amount (or credit amount, etc.).

3.3. Session Database

FIG. 6 is a tabular representation 600 of the session database 320 of FIG. 3. The tabular representation 600 of the session database 320 includes an example record or entry indicating information about an exemplary gaming session of a player. Those skilled in the art will understand that the session database 320 may include any number of entries. The tabular representation 600 also defines fields for the entries or records. The fields specify: (i) a session identifier 602 that uniquely identifies a session; (ii) a player identifier 604 that uniquely identifies a player; (iii) a date 606 that includes a representation of a date and/or time that is associated with the session; (iv) a handle pull identifier 608 that uniquely identifies a handle pull or game of the session; (v) a wager 610 that includes a representation of an amount the player has wagered on the handle pull; (vi) an intermediate outcome 612 that includes a representation of an intermediate outcome associated with the handle pull, such as an initial hand of cards or an initial set of game symbols; (vii) a first draw combination 614 that includes a representation of any game symbols, such as cards, to be held and/or discarded in determining a first final outcome; (viii) a second draw combination 616 that includes a representation of any game symbols, such as cards, to be held and/or discarded in determining a second final outcome; (ix) a third draw combination 618 that includes a representation of any game symbols, such as cards, to be held and/or discarded in determining a third final outcome; (x) a target outcome 620 associated with the handle pull, which provides an indication of one or more outcomes (or one or more sets of outcomes) that the player prefers to achieve; and (xi) a wager allocation 622 that includes a representation of percentages and/or amounts and indicates an allocation of the wager associated with the handle pull to one or more draw combinations.

A handle pull may correspond to a single play or game at a gaming device. In some embodiments, a handle pull may refer to play related to a single wager. For example, in video poker, a player might play a single game in which a single initial hand is used to determine two final hands (which may or may not require an additional wager). This single game may be considered to include either one or two handle pulls. In some embodiments, a handle pull may refer to a single complete game (e.g., including one or more hands, decisions, or plays) related to one or more wagers. For example, in video blackjack, a user might play a single game in which he splits a pair of sevens, requiring an additional wager. This single game may be considered to include either one or two handle pulls.

The intermediate outcome 612 may be any outcome generated by or transmitted among any or all of gaming device 108, 110 and 112 or server 102. An intermediate outcome typically is a primary or initial outcome during play of a game that may affect a final outcome of the play of the game. For example, an intermediate outcome may not conclusively determine the payout or prize to be awarded user, such as where the player has to make a decision before the final outcome is determined, or where the play of the game is still subject to an element of chance. Examples include (but are not limited to):

An initial five-card hand dealt to a user, before the user selects replacement cards in video poker An entry into a bonus round in a reel-slot game An initial two-card blackjack hand dealt to a user, before the user has made further decisions A blackjack hand, after the user has made at least one decision (e.g., hit), but while the user still has opportunity for further decisions (e.g., additional hits, splits)

A seven-card pai gow poker hand dealt to a user, before the user has decided how to split the hand into separate five-card and two-card hands A stack of four tiles in pai gow, before the user has decided how to split the tiles into two hands A war in the game of casino war, before the user has decided whether to surrender half his bet or to add to his initial bet and go to war Not all of the fields depicted in FIG. 6 are required, and various substitutions, deletions and other changes to the tabular representation will be readily apparent to those of ordinary skill in the art. For example, the target outcome 620 is not needed in many embodiments. As another example, neither the player identifier 604 nor the date 606 is needed in many embodiments. The depicted fields, for example, the draw combinations and intermediate outcome, are for illustration only. Various other types and/or representations of outcomes and draw combinations are described herein and still others will be readily apparent to those of skill in the art.

The representation of the values for wager allocation 622 are depicted in FIG. 6 in terms of percentages of a wager. Allocations of a wager may alternatively be represented as a ratio (e.g., "3:4:3"), or as coin amounts (e.g., 2-5-3), credit amounts, or monetary amounts (e.g., $1). Many other representations are possible.

4. Processes

The system discussed herein, including the exemplary hardware components and the databases, are useful to perform the methods of the invention. It should be understood, however, that not all of the above-described components and databases are necessary to perform any of the present invention's methods. In fact, in some embodiments, none of the above-described system is required to practice the invention's methods. Thus, the player database 208 described above with respect to FIG. 4 is useful for tracking users and information about them, but it is not absolutely necessary to have such a database in order to perform the methods of the invention. For example, the methods described below may be practiced using a conventional player-tracking list in conjunction with a casino's conventional accounting system.

Figure 7:
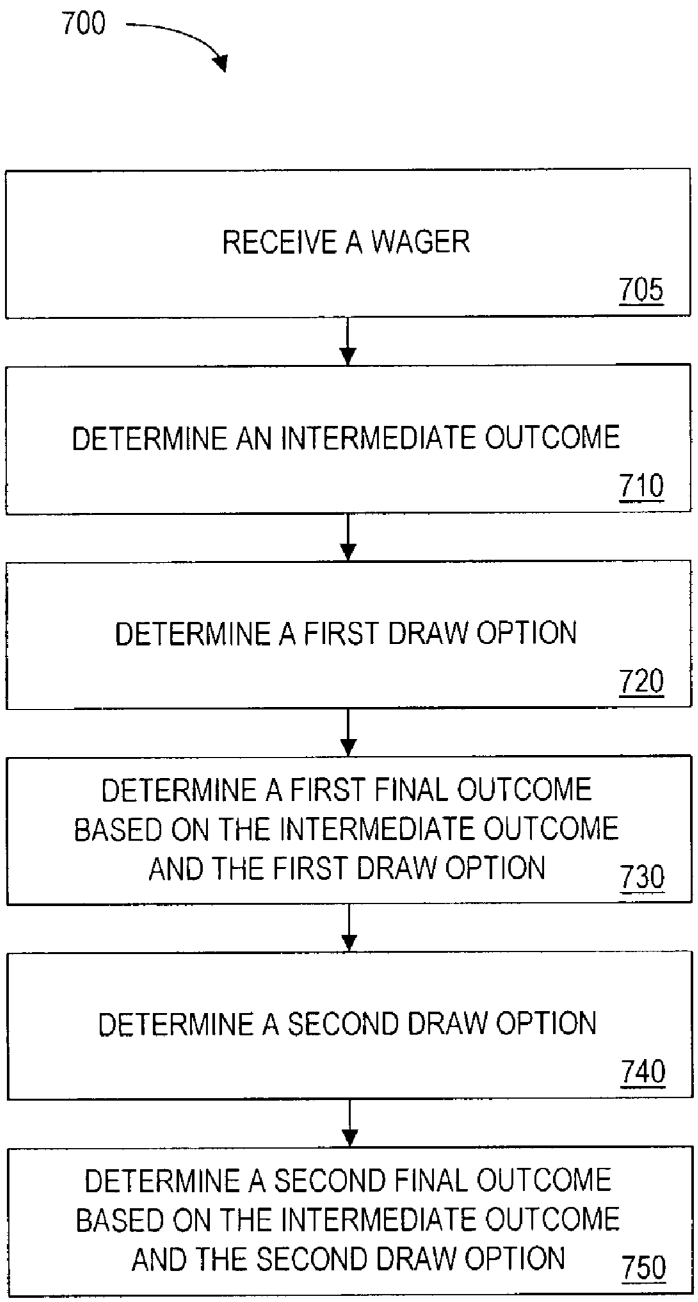
FIG. 7 is a flow diagram illustrating an exemplary process for facilitating play of a gaming device for use in some embodiments of the present invention.

Referring to FIG. 7, a flow chart 700 represents some embodiments of the present invention that may be performed by a server, such as a casino server or a Web server, a casino representative, such as a dealer at a table game, and/or by a gaming device including, without limitation, a video blackjack machine and a video poker machine. The particular arrangement of elements in the flow chart of FIG. 7, as well as the other flow charts discussed herein, is not meant to imply a fixed order to the steps; the steps can be practiced in any order, sequence, and/or timing that is practicable for various embodiments of the present invention.

A gaming device, for example, receives a wager (step 705) and determines an intermediate outcome in a game (step 710). The gaming device also determines a first option for play of the game (step 720). The gaming device generates a first final outcome based on the intermediate outcome and the first play option or strategy (step 730). The gaming device also determines a second option for play (e.g., a second set of cards to be held in an initial hand of cards) (step 740). The gaming device then generates a second final outcome based on the intermediate outcome and the second option (step 750).

In this way, two final outcomes may be determined that are based on the same intermediate outcome, each final outcome according to a respective option for play. The first option and the second option may be different (but need not be). For example, in a video poker example, each of two draw combinations may identify a different set of one or more cards to be held.

In the descriptions that follow, each of the steps outlined above will be discussed in greater detail. Note that not all of these steps are required to perform the method of the present invention. Further, additional and/or alternative steps for performing are also discussed below. For example, in some embodiments many additional steps may be added to update and maintain the databases described above, but as indicated, it is not necessary to use the above described databases in all embodiments of the invention. Also note that the above general steps represent features of only some of the embodiments of the present invention. Steps of any of the various processes described herein may be combined and/or subdivided in any number of different ways so that the method includes more or fewer actual steps. Some alternative combinations and/or subdivisions of steps are described herein, and others will be apparent to those of ordinary skill in the art. In other words, methods of the present invention may contain any number of steps practicable to implement any or all of the processes described herein.

Many descriptions herein focus on some embodiments of the present invention where a user is at a video poker machine, such as a 9/6 JACKS OR BETTER™, DEUCES WILD™, or JOKERS WILD™ machine. Of course, some embodiments of the present invention are additionally and/or alternatively directed to a user playing a reel slot game, blackjack, craps, war, pai gow, pai gow poker, and/or other machine and table games. Further, as described above, some embodiments of the present invention are directed to a user gambling from a remote location. For example, a user may gamble at a Web-based casino from a remote computer in communication with a casino server via the Internet.

4.1. Receiving a Wager

A user may place a wager in a number of ways well known in the art. For example, at the start of a gaming session, a user may insert a bill into a bill validator attached to a gaming device. Alternatively, the user may insert coins into a coin slot of the gaming device. The user may thereby establish a credit balance on the gaming device. A user may place wagers using a credit balance by, for instance, pressing a button on a gaming device (e.g., "Bet Max", "Bet One") and then initiating a handle pull. In another example, a user at a gaming table may make a wager by placing chips onto specially marked areas of the gaming table.

In still another example, a user gaming via a remote location (e.g., via the Internet using a personal computer or personal digital assistant (PDA)) may authorize charges to a financial account in order to establish a balance of credits with a casino server (e.g., by transmitting a credit card number via a Web site or via a telephone). The user may then place wagers using these credits. For example, the user may key in a desired wager amounts to the keyboard of his PC, and may then press an "Enter" key. A user gaming via a telephone or cell phone may call up a casino server and authorize a wager by pressing a designated key combination. There are many other possible ways for the user to place a wager; other ways are described herein and others will be apparent to those of ordinary skill in the art.

4.2. Determine an Intermediate Outcome

To determine an intermediate outcome, the processor of a gaming device may execute a routine to generate one or more random numbers, and may then associate these numbers with particular game symbols. For instance, in some video poker embodiments, the processor of a gaming device will generate fifty-two random numbers, each number representing the position of a predetermined corresponding card in a shuffled electronic deck. In such embodiments, the intermediate outcome is the first five cards in the deck. In a table game example, an intermediate outcome may be generated by a dealer. The dealer may, for instance, shuffle cards and then deal a hand to a blackjack player and a hand to the house. In some embodiments of the present invention, a server generates an intermediate outcome and transmits an indication of the intermediate outcome to a gaming device. Thus, in some embodiments a gaming device may determine an intermediate outcome by receiving an indication of the intermediate outcome. In other embodiments, a gaming device may be preloaded with one or more intermediate outcomes, and may use the stored intermediate outcomes in a predetermined order or in a random or pseudo-random sequence. Many other methods for determining intermediate outcomes are possible.

4.3. Determine One or More Play Options

In one or more embodiments of the present invention, once an intermediate outcome has been generated, the user typically must make a decision as to how to proceed to a final outcome. Examples with respect to various types of games are provided below, and others will be apparent to those of ordinary skill in the art.

In some embodiments involving video poker, for example, the intermediate outcome is a five-card hand. The user then may choose anywhere from zero to five of the cards in the hand to discard (and/or may designate from zero to five of the cards in the hand to hold). The cards not held are then replaced with new cards (typically cards that are unpredictable to the user), and the user is paid based on the resulting hand. The user's choice of cards to hold and/or discard thereby constitutes a draw combination or strategy for generating a secondary or final outcome.

In some embodiments, a player of a reel slot game may win an entry into a bonus round. The user's entry into the bonus round thus constitutes an intermediate outcome. The user may then have the opportunity to choose among several strategies for completing the bonus round. For example, the user may have the choice of "opening" one of three doors displayed on the gaming device in a bonus round. Behind each door is a prize, and the user wins only the prize behind the door he chooses to open. In this example, the user's choice of which door to open is a selected play option or strategy, and the prize behind the chosen door is the secondary outcome.

In some embodiments related to blackjack, an intermediate outcome consists of a user's two-card hand, and the house's upturned card. The user may then choose among several options to play out the hand, including whether to hit, stand, split, double down, or surrender. It will be understood that if the user hits or splits, for example, he may reach another intermediate outcome in which he still has a choice among two or more strategies (e.g., to hit again, to stand, etc.)

In some embodiments directed to pai gow poker, an intermediate may comprise seven cards dealt to a player. The player must then choose how to divide the seven-card hands into a five-card hand and a two-card hand. The user's strategy, therefore, includes how to divide his hand (e.g., a designation of which cards to contribute or assign to which of the two hands. After the user has made two separate hands, the banker will do the same. The user's hands are then compared to the banker's hands in order to determine whether the user has won, lost, or pushed. The two user hands may thus be described as a secondary outcome. It will be understood, however, that the two user hands and the two banker hands may also be described as together defining a secondary outcome.

In some embodiments, an intermediate outcome consists of four tiles given to a user in a game of pai gow. The user's strategy then indicates a determination of how to divides his four tiles into two hands. The dealer also divides his tiles into two hands. The user's two hands are then compared to the dealer's two hands to determine if the user has won, lost, or pushed. As described above, the two user hands may thus be described as a secondary outcome, and/or the two user hands and the two banker hands may be described as together defining a secondary outcome.

In some embodiments related to casino war, an intermediate outcome occurs when the user's card matches the casino's card (i.e., the user and the casino are in "a state of war"). The user then has two choices: He can surrender half of his original bet, keeping the other half ("surrender"); or he can make a second bet ("go to war"). Therefore, available options for play are to surrender, or to go to war. If the user makes a second bet, then the house matches the second bet. A new card is then dealt to the user, and a new card is dealt to the house. The cards are then compared to determine whether or not the user wins the house's second bet, or loses both of his bets.

The following describes various ways by which a gaming device, for example, may determine one or more options for generating a final or secondary outcome based on an intermediate outcome. Determining a play option may include, for example, the gaming device determining one or more play options to offer to the player as choices. Such a determination may be based on the intermediate outcome and/or various predetermined criteria, some of which are described below. Alternatively, or in addition, determining a play option or strategy may include receiving an indication of: (i) an acceptance of a player of one or more options, (ii) a selection by a player of one or more options, (iii) a preference of a player for one or more options, (iv) an instruction by a player to continue play according to one or more play options, and/or (iv) a request by a player for one or more options. Any such indications may be received, for example, from a player, from a device operated by the player, from a server, from a casino employee or representative, from another gaming device, and/or from a memory medium (e.g., a smart card, a storage device of the gaming device).

The following describes various exemplary embodiments in which a user may indicate one or more strategies in a video poker game, with further reference to FIGS. 7-15. For the purposes of many of the examples described, the intermediate outcome is assumed to be a hand of five cards, where the user must then choose amongst various strategies or draw combinations that would discard and/or hold various combinations of cards of the initial five-card hand. Of course, those of ordinary skill in the art will understand that many features described herein may be practicably applicable to other types of games, and also that embodiments for video poker need not be limited to the examples provided. For example, in some embodiments of the present invention related to video poker, an initial hand may include more than or less than five cards.

FIGS. 8-18 depict some embodiments of a display, such as a display at a gaming device. In many of the exemplary displays, an intermediate outcome of a five-card poker hand is represented as it might appear on the screen of a gaming device according to some embodiments of the present invention. Each of FIGS. 8-18 incorporates various additional and/or alternative information, as described in detail below, including one or more options for play presented to the player.

Figure 8:
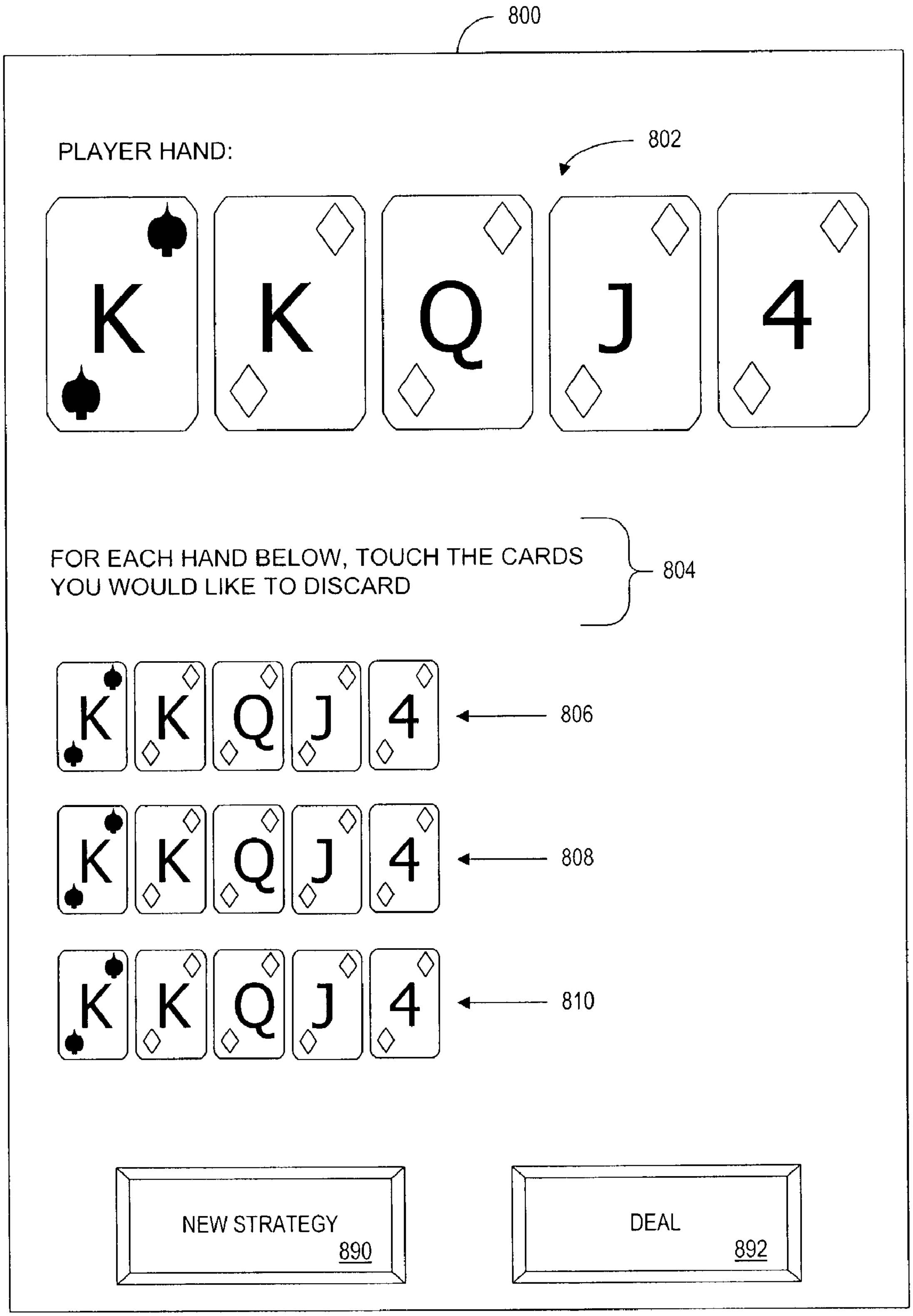
FIG. 8 is a drawing illustrating an example of a first gaming device display screen as it may be used on a gaming device 108 according to some embodiments of the present invention.

Referring to FIG. 8, a five-card hand 802 serving as an intermediate outcome is replicated one or more times on the display screen 800 of a gaming device. The user's initial five-card poker hand 802 is replicated so that three identical hands 806, 808 and 810 are displayed at the gaming device. The replicated hands may be displayed at or close to the same time that the initial hand 802 is displayed, or may be displayed at some time after, or may be displayed only after receiving a request or other signal from the user. It will be understood that more than or less than three replicated hands may be presented, and the number displayed may vary from one handle pull to another; embodiments need not be limited to displaying only three hands. Further, in some embodiments of the present invention, the user may decide, either before or after viewing the intermediate outcome, how many hands he would like to play and/or how many draw combinations he would like to try.

Referring still to FIG. 8, the user may select discards in a fashion currently used on many video poker games. For example, in one or more of the three hands 806, 808 and 810, the user may touch cards he wishes to discard (and/or touch cards he wishes to hold). Instructions for how to indicate a desired strategy may be displayed, such as by text description 804. The user may then press a "DEAL" button 892, which signals to the gaming device to have cards in each hand 806, 808 and 810 replaced with new cards, as necessary, according to any selected or identified draw combination for the respective hand. In some embodiments, if the user wishes to employ more than three different strategies, then the user may press the "NEW STRATEGY" button 890. A new replica of the intermediate outcome will then appear, and the user may select discards from the new hand as well.

It will be understood that a user need not play all of the number of replicated hands. For example, means may be provided for indicating that the player does not wish to play one of the hands 806, 808 and 810 (as opposed to having the gaming device determine that a failure to indicate any of the cards to hold or discard is a decision by the player to either hold or discard all of the cards). However, displaying a number of hands may encourage the player to play all of the displayed hands.

Figure 9:
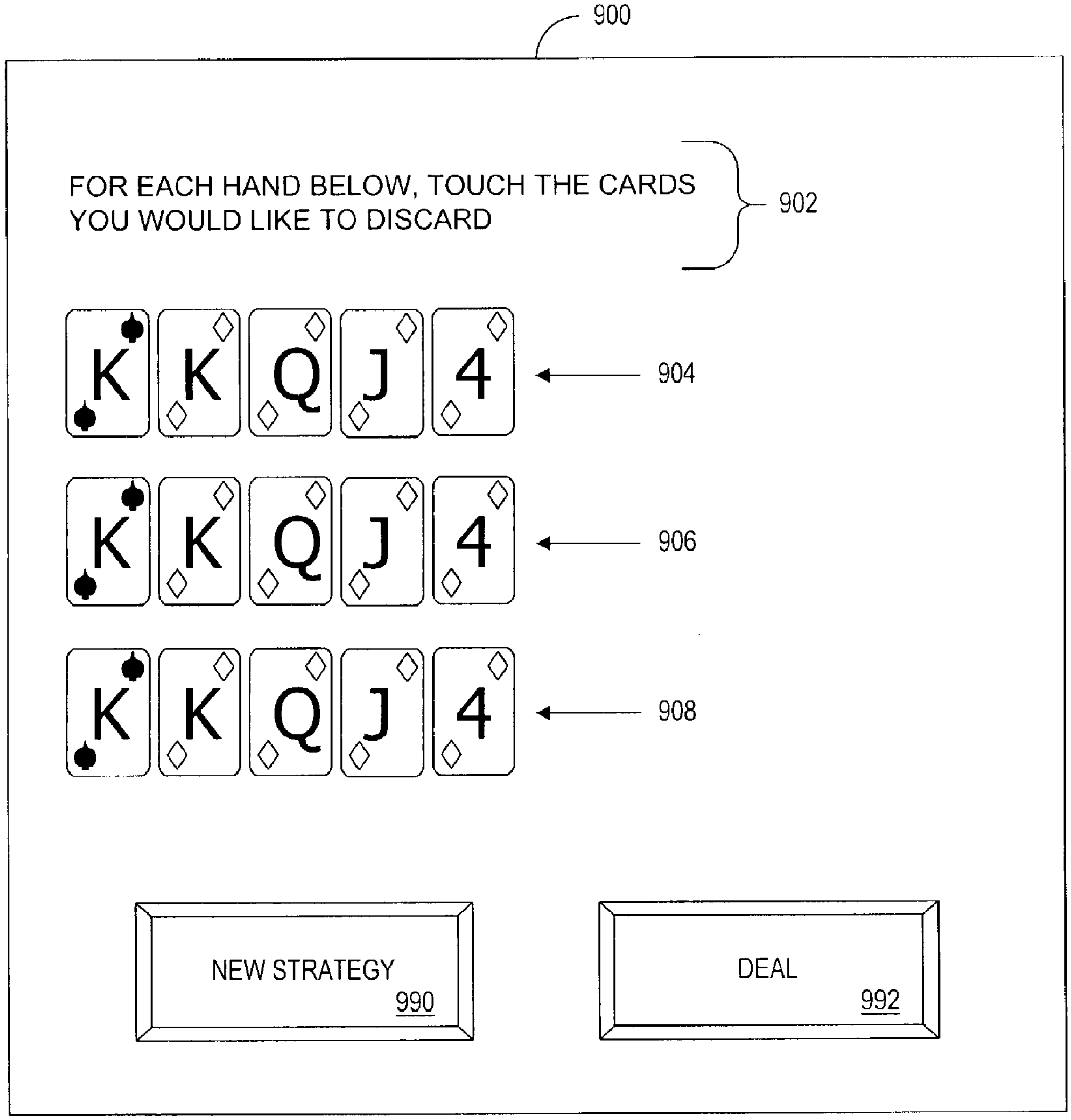
FIG. 9 is a drawing illustrating an example of a second gaming device display screen as it may be used on a gaming device 108 according to some embodiments of the present invention.

In FIG. 8, the initial intermediate outcome 802 is represented as a larger hand toward the top of the screen, and the several replicated hands 806, 808 and 810 are represented below the initial hand 802. Referring to FIG. 9, an alternative display 900 is depicted. In contrast to FIG. 8, the intermediate outcome (e.g., initial five-card hand) is represented only by the identical hands 904, 906 and 908. One or more of the hands 904, 906 and 908 may be used by the player to indicate selection of one or more strategies in a manner described above with respect to FIG. 8.

In some embodiments, there may be many replicas of the original hand, such that it may be tedious or otherwise inconvenient for the user to select discards from each of the individual replicas. Therefore, according to one embodiment of the present invention, a user may select one or more strategies, and then select the number of hands to be played using each strategy. For example, suppose the user receives an intermediate outcome of J(s), 10(h), 9(d), 5(d), 4(d), and fifty identical replicas of the initial hand are also displayed. Each of the fifty hands will ultimately determine a portion of the user's payout. The user may touch the 5(d) and the 4(d) on a first one of the fifty hands, indicating that he wishes to discard the 5(d) and 4(d). The user may then drag his finger from the first hand along the touch screen of the gaming device, passing over nineteen other hands. In this manner, the strategy the user selected for the first of the fifty hands may be conferred to the nineteen other hands. Therefore, in total, the user has now selected twenty hands for which the 5(d) and the 4(d) will be discarded.

Now the user touches the J(s) and 10(h) on a twenty-first hand, indicating he wishes to discard the J(s) and 10(h). Once again, he drags his finger from the twenty-first hand over 9 other hands. The user has thus selected ten hands for which the J(s) and the 10(h) will be discarded. Finally, the user touches the 10(h), 9(d), 5(d), and 4(d) from a thirty-first hand, indicating his wish to discard these four cards. He then drags his finger from the thirty-first hand over the remaining nineteen hands. So in total, the user has decided to play twenty hands according to a first strategy, ten according to a second strategy, and the remaining twenty according to a third strategy.

Of course, in the above example, there are many other ways in which the user might select the number of hands to be played according to a particular strategy. Some alternative or additional means for providing such functionality are described herein, and others will apparent to those having ordinary skill in the art. For example, the user might indicate a desired strategy, and may then type in a number to show how many hands are to be played according to the strategy. In another example, rather than dragging his finger over hands on a touch screen, the user might drag the pointer of a mouse, or may use arrow keys on a keyboard or on a gaming device to select hands. In some embodiments, the user may select hands to be played according to a particular strategy by touching the hands instead of by dragging his finger over them.

The user need not necessarily select cards from any replicated hand in order to choose a particular strategy. In some embodiments, the user might select cards from an enlarged hand that serves only to receive the user's selection, but does not get dealt additional cards.

According to some embodiments, different available options for play (e.g., draw combinations) may be indicated on the display screen of the gaming device with different indicia, including (but not limited to): underlining, highlighting, color-coding, and/or other identifying or marking of cards in the intermediate outcome.

Figure 10:
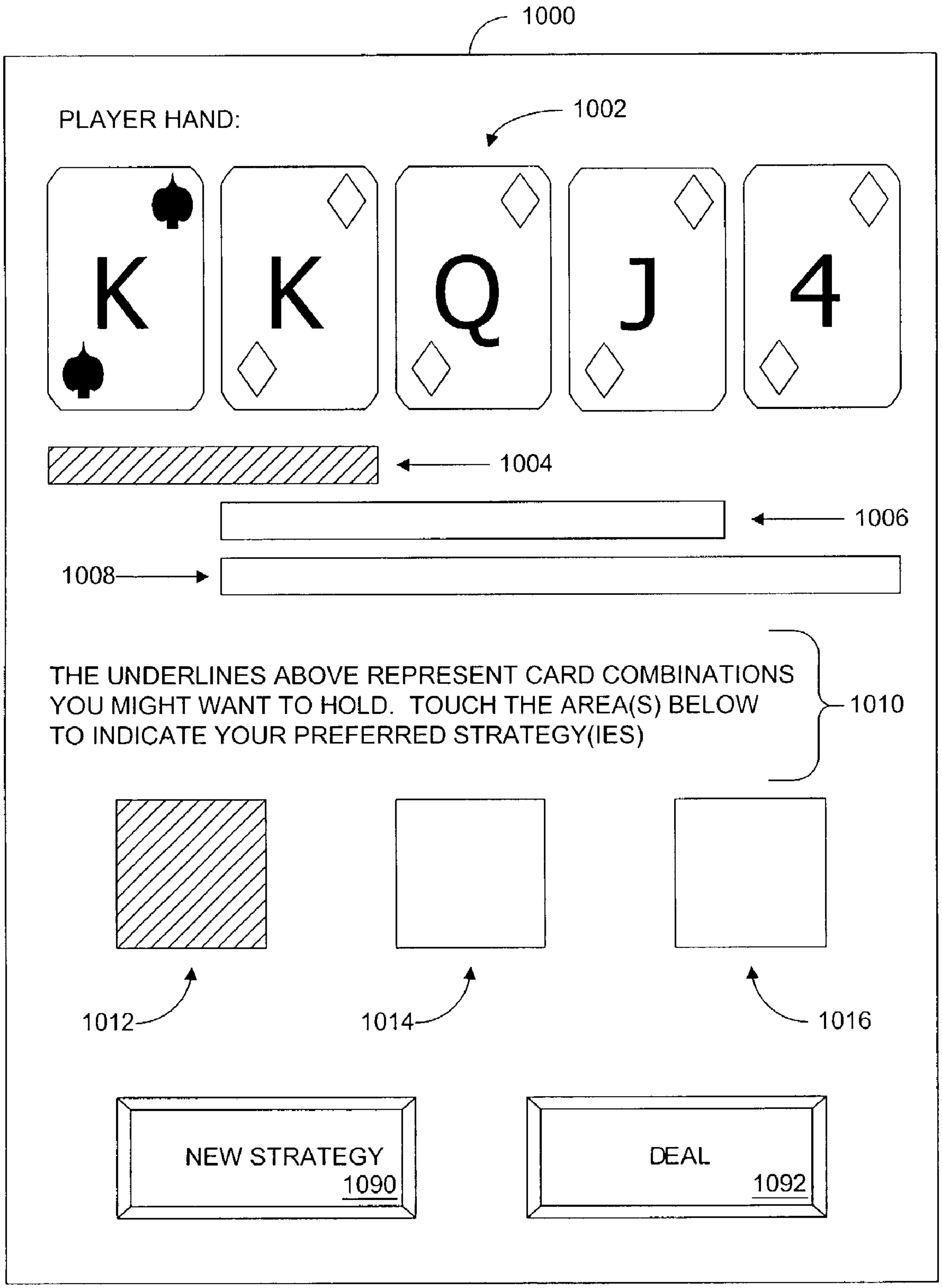
FIG. 10 is a drawing illustrating an example of a third gaming device display screen as it may be used on a gaming device 108 according to some embodiments of the present invention.

Referring to FIG. 10, an exemplary display 1000 is depicted that includes an initial hand (i.e., intermediate outcome) 1002 of K(d), K(h), Q(h), J(h), 9(h). Possible available draw combinations include:

1) Holding the two kings (discarding the Q(h), J(h), 9(h));
2) Holding the K(h), Q(h), J(h) (discarding the K(d), and 9(h)); or
3) Holding the K(h), Q(h), J(h), 9(h) (discarding the K(d)).

The first strategy is illustrated on the display 1000 of the gaming device with a blue underline 1004 beneath the cards to be discarded: the Q(h), J(h), and 9(h). The second strategy is illustrated with a red underline 1006 beneath the K(d) and 9(h). The third strategy is illustrated with a green underline 1008 beneath the K(d). Note that a single card may have multiple underlines. In this example, the J(d) has two underlines, a red underline 1006 and a green underline 1008.

In one or more embodiments, the underlines may appear under cards as a reflection of user choices. For example, a user may begin playing the initial hand 1002 by touching the Q(h), J(h), and 9(h), causing these cards to be underlined in blue. The user may then press a button 1090 on his gaming device marked "NEW STRATEGY" (or otherwise indicating to the user that an additional draw combination may be designated by pressing the button). The user then touches the K(d) and 9(h), causing these cards to be underlined in red. The user then touches "NEW STRATEGY" 1090 again and touches the K(d).

Alternatively, the underlines may be depicted by the gaming device prior to the user's selection of discards. The underlines may indicate probable user strategies determined by the gaming device. The determination of one or more draw combinations by the gaming device is discussed further below.

In some embodiments of the present invention, the user may indicate selection or acceptance of a suggested strategy by, for example, pressing an electro-mechanical button, touching or clicking with a pointer device a graphic button, or selecting a displayed menu item. Thus, one or more draw combinations (i.e., play options) may be associated with a particular displayed indicia or graphic displayed at the gaming device, and/or with various input devices of the gaming device (e.g., a button). In some embodiments, by touching an area of the display that is associated with a particular available option, such as the blue area 1012 depicted in FIG. 10 corresponding to the blue underline 1004, the user can indicate he wishes to pursue the particular strategy or draw combination.

As described variously herein, one or more draw combinations (i.e., play options) may be indicated, identified, described, and/or otherwise represented on the display of the gaming device (e.g., a set of one or more cards may be underlined as in FIG. 10). According to some embodiments, the means by or way in which a user may indicate a desired strategy may incorporate or include the information describing or representing the available strategy. For example, in some alternative embodiments the underlines 1004, 1006 and 1008 would be represented by graphic buttons or other selectable or interactive control that a user could touch or click, for example. In such embodiments, the areas 1012, 1014 and 1016 would not be necessary.

There are, or course, many other ways to use markings to indicate possible strategies. For example, rather than underlining a card to be discarded, a gaming device may display one or more colored borders around the card. Cards with blue borders would then be discarded using the first strategy, cards with red borders using the second strategy, and cards with green borders using the third strategy. In addition, any such markings may indicate cards to be held rather than cards to be discarded.

In some embodiments, cards to be discarded may have a colored "X" marked on top of them. In such embodiments, different player strategies stemming from the same intermediate outcome may be executed sequentially rather than simultaneously. Upon the execution of a first strategy, for example, certain cards are crossed out from the intermediate outcome, though the intermediate outcome remains displayed. New cards are then dealt to replace the cards that had been crossed out. The new cards may appear, for example, beneath the intermediate outcome. Once the first strategy has been executed, the new cards that had been dealt disappear from the display screen. The cards that had been crossed out from the intermediate outcome now appear without crosses. Now, a second strategy may be executed. For example, a new combination of cards may be crossed out from the intermediate outcome, and any new cards are dealt to replace those that have been crossed out. The new cards dealt for the second strategy may, by chance, be the same cards that had been dealt for the first strategy. Once the second strategy has been executed, this procedure may be repeated for a third strategy, and so on.

Figure 11:
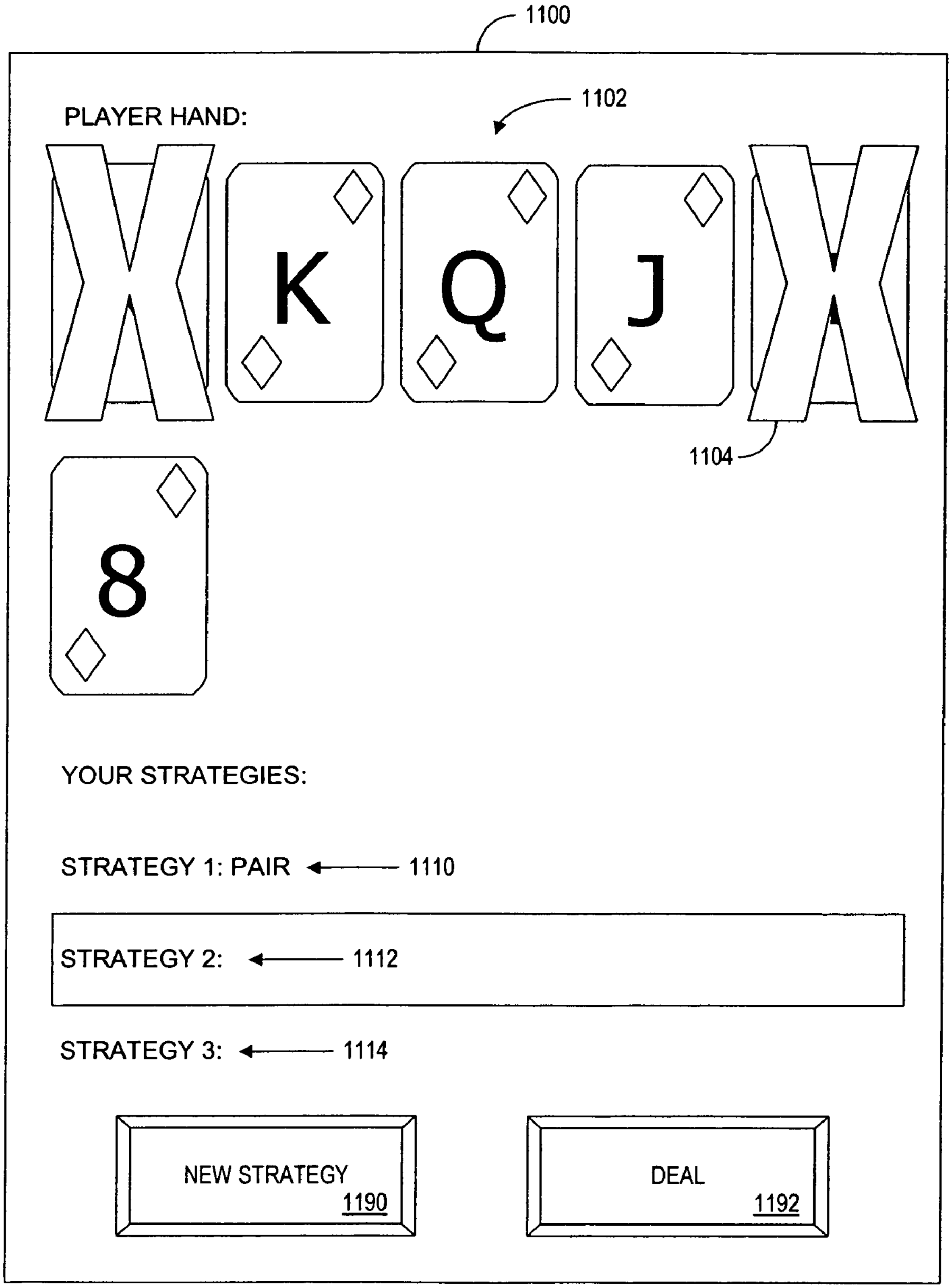
FIG. 11 is a drawing illustrating an example of a fourth gaming device display screen as it may be used on a gaming device 108 according to some embodiments of the present invention.

FIG. 11 depicts some embodiments in which cards of the initial hand may be crossed-out, obscured, or otherwise marked for discard. In FIG. 11, the player has chosen to pursue three strategies 1110, 1112 and 1114 for an initial hand 1102. For each strategy, the player touches cards to be discarded on the exemplary display 1100 of the gaming device. As depicted in FIG. 11, the player's first strategy 1110 has already been executed, resulting in a pair. The player's second strategy 1112 is in the process of being executed. The player has chosen to discard the first and fifth card 1106 in the intermediate outcome, and the first of these has already been replaced. For example, a card 1106 that the player touches then appears "crossed out" by an "X" 1104. A new card 8(d) has been deal, and another new card will be dealt to a position 1108 beneath the card 1106 to be replaced.

In one or more embodiments, an intermediate outcome of five cards is represented toward the top of the screen of a gaming device. Underneath the intermediate outcome are represented two rows, each row divided into five spaces. Each of the five spaces can hold a card. A user can thus decide on a first strategy with which to proceed from the displayed intermediate outcome, such as to discard the first and fifth cards. To indicate his decision, the user touches the first and fifth spaces in the first row beneath the intermediate outcome. These spaces are then filled with new cards. The new cards serve as replacements for the first and fifth cards in the intermediate outcome. The user may proceed in a similar fashion for his second strategy. Replacement cards may be provided after each individual draw combination is indicated, or replacement cards may not be provided until after a predetermined number of strategies are indicated. Also, replacement cards for all accepted strategies need not be provided at the same time.

In these and other embodiments of the present invention, therefore, a player may pursue different play options without the requirement that any cards of an initial hand be duplicated, displayed, or represented again in a different hand. Suppose he decides to discard third, fourth, and fifth cards from the intermediate outcome. So he touches the third, fourth, and fifth spaces in the second row beneath the intermediate outcome. These spaces are then filled with cards, meant to replace the third, fourth, and fifth cards in the intermediate outcome.

Figure 12:
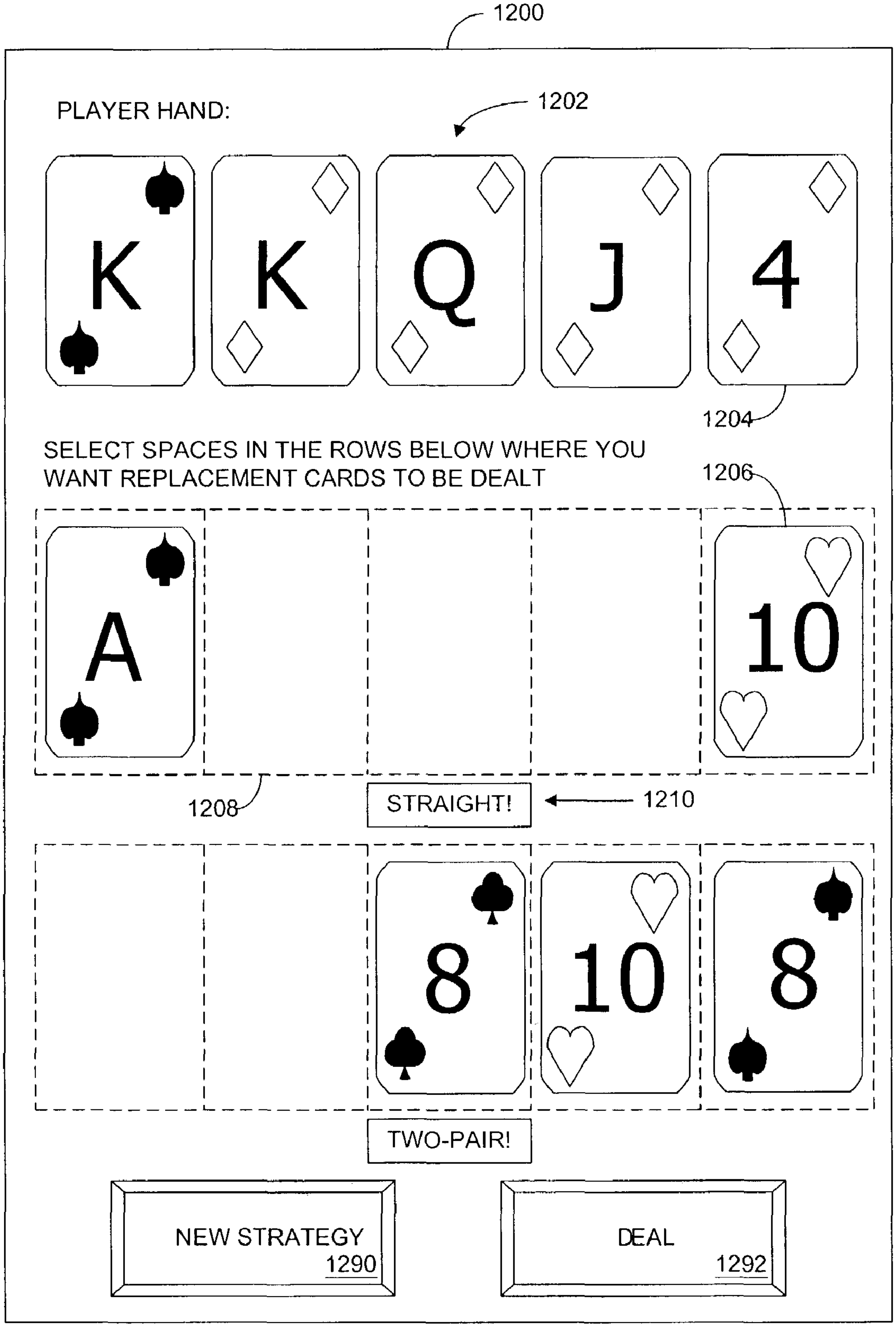
FIG. 12 is a drawing illustrating an example of a fifth gaming device display screen as it may be used on a gaming device 108 according to some embodiments of the present invention.

An exemplary display 1200 at a player's gaming device is shown in FIG. 12. The user's first strategy with respect to the intermediate outcome 1202 has resulted in replacement cards of A(s) and 10(h) 1208 in a first row 1206, giving the user a straight as the secondary outcome of his first strategy. The user's second strategy has resulted in replacement cards of 8(c), 10(h), and 8(s), giving the user two-pair as the secondary outcome for his second strategy.

Although FIG. 12 illustrates only two rows beneath the intermediate outcome, those of skill in the art will understand that any number of rows could be presented. As described variously herein, if the user wishes to play more strategies on the intermediate outcome 1202 than can be displayed at once on the screen of the gaming device, then the user might press a button, such as a "NEW STRATEGY" button 1290 provided at the gaming device, and additional blank rows, may be displayed, perhaps eliminating rows in which outcomes had already been determined.

In embodiments such as those depicted in FIG. 12, secondary outcomes may appear as changes to an intermediate outcome. Thus, as depicted in FIG. 12, a determination by the player as to what the final or secondary outcome resulting from the first strategy is may require the player to refer to both the displayed intermediate outcome 1202 and the first row 1206. For example, the secondary outcome comprises the intermediate outcome 1202 with its first and fifth cards replaced by the cards appearing in the first row 1206.

In some embodiments, the gaming device indicates possible strategies the user might follow. The user may then choose one or more of the indicated strategies, and/or may select one or more play options that are not indicated. Strategies may be represented to the player in a number of ways. Some methods and means are described herein, and others will be apparent to those of ordinary skill in the art. For example, as described above, underlining or highlighting may be provided. In some embodiments, the gaming device might display text descriptions that identify the strategies or draw combinations. For example, a text description that identifies one or more draw combinations may be displayed to the player. The description may be included as the text on, in, or near a button or menu item that the user may press in order to pursue the one or more draw combinations associated with the provided control (e.g., electro-mechanical button, graphic button, check box, menu list or menu item).

Figure 13:
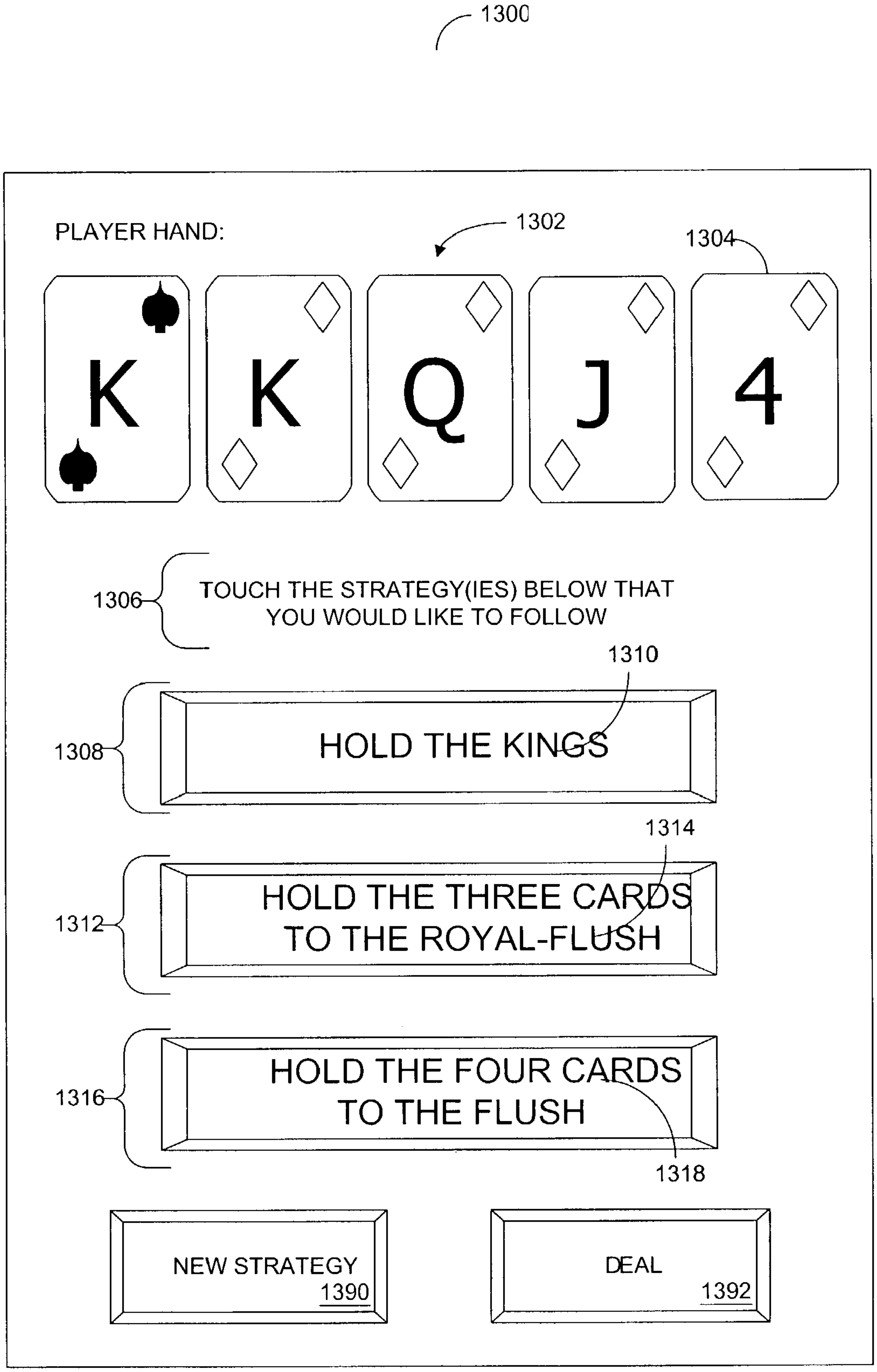
FIG. 13 is a drawing illustrating an example of a sixth gaming device display screen as it may be used on a gaming device 108 according to some embodiments of the present invention.

FIG. 13 depicts an exemplary display 1300 that includes an intermediate outcome 1302, and instruction for selecting a strategy 1304, and three option buttons 1308, 1312 and 1316. Each of the buttons 1308, 1312 and 1316 includes a respective text description 1306, 1310 and 1314. Some example text descriptions for use in various embodiments of the present invention may include:

Hold the kings
Hold the kings and discard remaining cards
Hold the kings and one other card
Hold the K(d) and K(h)
Hold the pair
Hold the first two cards
Hold the first and the second card
Discard the Q(h), J(h), 9(h)
Discard the Q, J, 9
Draw to the royal-straight-flush
Draw to the straight-flush
Discard the last three cards
Discard the third, fourth, and fifth cards
Hold the diamonds
Hold the high cards
Hold the diamond connectors Those of ordinary skill in the art will recognize that the descriptions 1306, 1310 and 1314 need not be placed in or on the exemplary graphic buttons 1308, 1312 and 1316, as depicted in FIG. 13. For example, an appropriate description could have been displayed next to or near a button, checkbox, selectable menu item, or other control, that is associated with the draw combination (e.g., play option) identified by the description. The user could then select a particular strategy (or strategies) by selecting the appropriate control associated with the desired option. In another example, descriptions of available options could be communicated to as text, and the player could be instructed to select any desired option(s) by selecting (e.g., clicking, touching) an identified control or key of a keyboard, or by vocalizing a choice (e.g., via an IVR unit). For example, a text description that identifies two or more draw combinations may read: "If you want to hold the two Kings, press button "A". If you want to go for the long shot, press button "B".).

In some embodiments, a user presented with multiple strategies may touch text identifying the desired strategy on the screen to indicate his strategy selection. Alternatively, if each of the presented strategies is numbered, the user may touch a button on his gaming device having a corresponding number. By pressing the button, the player indicates to the gaming device that the player wishes to pursue a final outcome using the option (e.g., draw combination) associated with the button). The user might also key in the number of his desired strategy using a keypad. Many other ways of accepting, selecting, or requesting strategies are possible.

Figure 14:
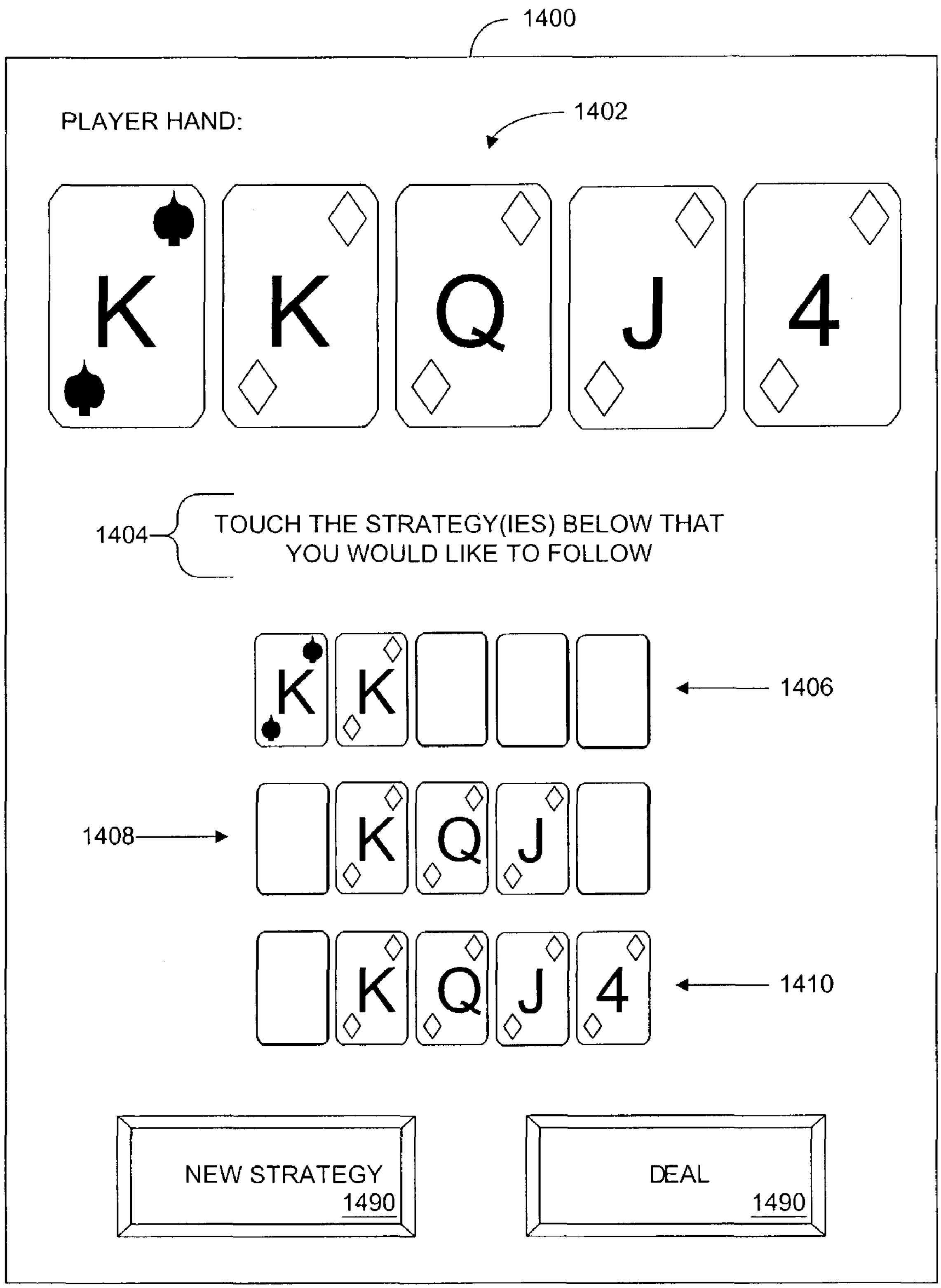
FIG. 14 is a drawing illustrating an example of a seventh gaming device display screen as it may be used on a gaming device 108 according to some embodiments of the present invention.

As depicted in the exemplary display 1400 of FIG. 14, in some alternative embodiments, one or more cards of a player's initial hand 1402 may be replicated one or more times into one or more hands 1406, 1408, 1410. For instance, if the original intermediate outcome is K(s), K(d), Q(d), J(d), 4(d), then a list of displayed hands might be:

K(s) K(d)
K(d), Q(d), J(d)
K(d), Q(d), J(d), 4(d)

Each hand 1406, 1408 and 1410 indicates which cards in the intermediate outcome 1402 would be held if the strategy corresponding to the hand is selected. In some embodiments, the cards to be discarded from the original hand are not missing from the hands 1406, 1408 and 1410, but may be blacked out, crossed-out, grayed out so that the card ranks and suits are still visible, or otherwise represented in a manner that indicates that those cards would not be a part of a final outcome resulting from selecting that particular draw combination. In some embodiments, each hand contains the five original cards. However, cards to be discarded may be underlined or otherwise identified, as described variously herein.

Instruction 1404 instructs the user to touch on the display 1400 the strategy or strategies desired. Thus, the controls depicting the various draw combinations 1406, 1408 and 1410 convey information that identifies the respective draw combinations (e.g., represent which cards will be held) and are also operable to indicate to the gaming device what option(s) the user would like to pursue (e.g., by being touched by the user).

To list strategies available to the user, the gaming device may determine one or more possible strategies and/or may receive an indication of one or more possible strategies from a server. Alternatively or in addition, a gaming device may: (i) determine a subset of determined available options to represent to the player; (ii) determine an order in which to represent any available strategies.

There are various ways for the gaming device to determine what strategies to present to the user. The gaming device may identify strategies having expected payouts that meet certain criteria. For example, the gaming device may, for a particular initial hand, list all possible strategies with expected payouts in excess of 0.6 tokens. For a weaker initial hand, the gaming device might list all possible strategies with expected payouts in excess of 0.5 tokens. In some embodiments, the gaming device may determine options having an expected return above a predetermined threshold, below a predetermined threshold, or within a range. In another example, the gaming device may always just list the six strategies (or some other number of strategies) having the best expected payouts.

Strategies that maximize the possibility of particular secondary outcomes may be identified. For example, the gaming device may always list strategies that give the user the opportunity to achieve a straight-flush. In this example, if a user held A(d), 10(d), 6(c), 4(h), 2(s), the gaming device would list holding just the A(d) and 10(d) as a possible strategy in order to allow the possibility of a royal-straight-flush in diamonds.

Strategies whose standard deviations in payouts meet certain criteria may be identified. For example, the gaming device may always list strategies with standard deviations in payouts exceeding a certain threshold. Such strategies are typically ones with very high potential payouts, but also with risks of total loss.

In some embodiments, strategies that are similar to those previously employed by a user (or users) may be identified. For example, a casino server may maintain a database of strategies, such as session database 600, that a user has employed in previous handle pulls. When a given intermediate outcome occurs, the server may search the database for similar intermediate outcomes that had occurred for the player during prior handle pulls. The casino server would then determine the strategy the user had followed, and would present a similar strategy for the present situation. If a number of similar intermediate outcomes had occurred previously for the user, the casino server may discern several different strategies the user had previously chosen, and may then present multiple strategies in the current situation, each similar to a strategy previously chosen.

As an example, the user currently holds J(s), 9(s), 8(s), 4(d), 3(h). The processor of the casino server then executes a procedure to determine that the significant aspects of the hand are: 1) the user holds only one high card, and 2) the user holds three cards to a straight-flush. The casino server then searches session database 600 and determines that the user has in the past had fifteen hands containing both a single high card and containing three cards to a straight-flush. In eight of those cases, the user chose to keep the three cards to the straight-flush and to discard the others. In five of those cases, the user chose to keep the high card and to discard the four others. In two of those cases, the user discarded all five cards. Therefore, in the present situation, the casino server may cause the user's gaming devices to present the following strategies to the user: 1) hold only the J(s), 9(s), 8(s); 2) hold only the J(s); and 3) hold nothing.

The gaming device may show all possible strategies to the user. In many video poker embodiments, each strategy consists of five binary decisions, each decision being whether or not to hold one of the cards. Combining five binary decisions makes for a total of $2^5$, or 32 total possible strategies.

The gaming device may determine one or more strategies that benefit the casino (e.g., over other strategies). Such strategies may, for example, have low expected values. Other strategies that benefit the casino may involve the possibility of a high payout; if a user gets a high payout, then other casino patrons (e.g., those near the user's gaming device) may be encouraged to gamble more.

Of course, a determination and/or identification of strategies to communicate to a user may rely on any combination of the above methods. For example, the casino server may always display strategies with either an expected payout above one token, or that involve holding three cards to a straight-flush.

The gaming device may display an option to the user that corresponds to all strategies not currently shown (or to some strategies not currently). The options, for example, may correspond to be an area on the touch screen that says "New Strategy" or "Other". If the user then touches the "New Strategy" area, additional strategies may be shown. Alternatively, the user may have the opportunity to manually enter a strategy. That is, rather then selecting a strategy that is already fully described by either text or by a hand with three cards discarded, the user may touch individual cards in a five-card hand to manually indicate his discards (and/or cards to be held).

When potential strategies are displayed to the user, the gaming device may determine an order in which they are displayed. For example, one strategy is represented toward the top of a display of the gaming device, another follows below it, and so on. Or, one strategy is displayed on the left of the screen, another follows to its right, and so on. Other organizations for displaying various draw combinations will be apparent to those of ordinary skill in the art. The presentation and/or ordering of the strategies may influence the user's final choice of strategies, the user's rate of play, or both. For example, if strategies are ordered in such a fashion as to cause frustration to the user in finding his preferred choice, the user may be tempted to leave the gaming device (and possibly to leave the casino). The following are exemplary methods for ordering possible strategies:

Strategies are ordered according to their expected payouts

Strategies are ordered according to their median payouts

Strategies are ordered according to their mode payouts

Strategies are ordered according to the standard deviation of their payouts

Strategies are ordered according to each strategy's maximum potential payout

Strategies are ordered according to each strategy's minimum potential payout

Strategies are ordered according to their chances of achieving a particular outcome, or one of a set of outcomes (e.g., a strategy that is most likely to result in royal-straight-flush is listed first, a strategy that is most likely to achieve one of a straight, flush, or full-house is listed first).

Strategies are ordered according to the number of discards required. (e.g., a strategy using no discards is listed first, followed by strategies with one discard, etc.)

Strategies are ordered according to the relative frequency with which the user has employed similar strategies in the past In some embodiments, strategies with like numbers of discards may be ordered in various ways. For example, a strategy that discards only the first card in the five-card hand is listed immediately before the strategy that discards only the second card, which in turn is listed immediately before the strategy that discards only the third card.

The ordering schemes described above may put strategies in ascending or descending order according to the various criteria, such as expected value or standard deviation in payouts. Further, as will be understood, any combination of the above ordering schemes may be used. For instance, a list of strategies ordered according to their expected payouts may be interwoven with a list of strategies ordered according to their likelihood of achieving a flush. As another example, strategies may be ordered according to their expected payouts. However, two strategies with equal expected payouts may be ordered according to their maximum possible payouts.

In addition to listing possible strategies for the user to choose, the gaming device may list various facts or information related to each strategy. Exemplary facts may include the following:

An expected payout of the strategy

One or more potential outcomes that can be achieved using the strategy

The standard deviation in the payout of the strategy

The odds or probability of achieving one or more outcomes using the particular strategy (e.g., for a strategy that involves holding the 11(h), 10(h), 8(h), 7(h), the gaming device might display the odds of achieving a straight-flush as "46 to 1 against").

The maximum payout that can be achieved using the strategy

The minimum payout that can be achieved using the strategy

The number of times a similar strategy has worked for the user in the past, or in the past N hands, or in the past N hands in which the similar strategy has been used.

The number of times a similar strategy has worked for another user in the past (e.g., a message that "your neighbor just hit two draws to a straight-flush in a row.")

An enticement for choosing the corresponding strategy

With respect to information about potential outcomes, for example, a user who holds an A(s), K(d), Q(h) in an initial hand might achieve a straight, three-of-a-kind, two-pair, or a single pair, but typically cannot achieve a royal-straight-flush, a straight-flush, four-of-a-kind, or a full-house. Next to these potential outcomes, the gaming device might list the corresponding payouts of the outcomes. In some embodiments, the corresponding payouts listed depend on the amount the user wagers on the particular strategy. For instance, if an outcome pays 800 times an initial wager, and the user will wager 25 cents towards achieving the outcome, then the payout may be listed as $200 (=$0.25*800).

With respect to indicating particular enticements or offers to the player in association with a particular strategy or draw combination, the gaming device may offer, for example, to double the payout for a straight-flush if the user chooses a strategy involving holding only three cards to the straight-flush. An enticement thus may serve to make the corresponding strategy as attractive, in some sense, as other possible strategies. For example, a user concerned solely with maximizing expected payouts would have the opportunity to consider employing one or more strategies he normally would not employ because of their low expected payouts. The opportunity to employ diverse strategies thus may add variety and excitement to the game.

In some embodiments, strategies for which enticements are presented may not have expected payouts as high as those of other strategies. However, the gaming device may provide enticements in dissuade the user from employing one or more strategies that would be less profitable for the casino. Among the numerous possible enticements are: higher payouts, free spins, immediate cash or credits or tokens, comp points, product discounts, discounts on meals or shows or hotel rooms, etc.

Another enticement according to some embodiments of the present invention is for the gaming device to contribute an amount toward a particular strategy. For example, the user may have made an original wager of $1. The gaming device then presents the user with a choice of two strategies. The gaming device further offers to match 20% of any money the user allocates to the second strategy. The user proceeds to allocate 50 cents to each strategy. The gaming device then adds 20% to the amount the user added to the second strategy, so that the user now has 60 cents at risk on the second strategy. Allocation of wagers amount different strategies is described in further detail herein.

Figure 15:
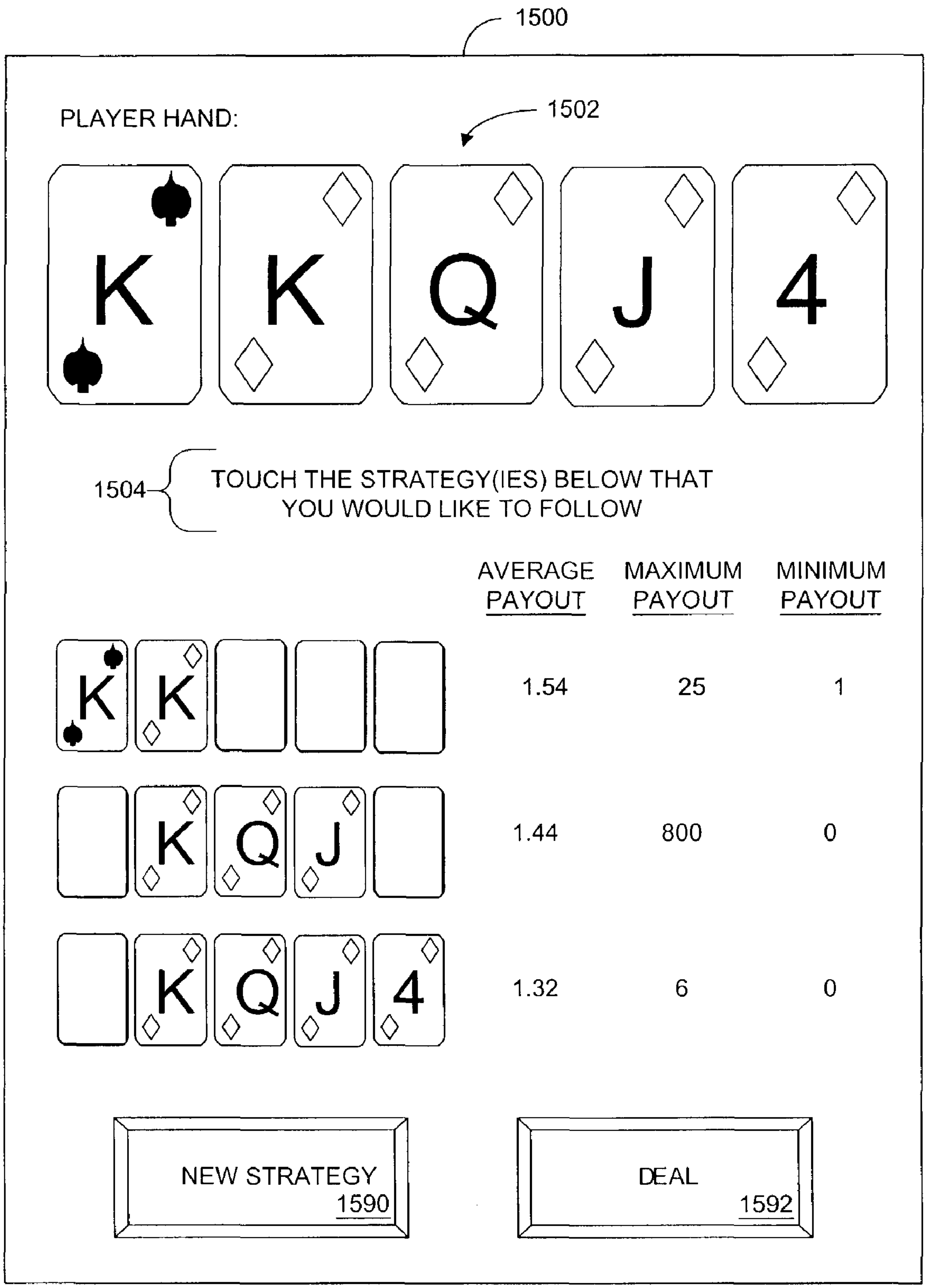
FIG. 15 is a drawing illustrating an example of a eighth gaming device display screen as it may be used on a gaming device 108 according to some embodiments of the present invention.

FIG. 15 depicts an exemplary display 1500 of a gaming device. Three strategies are presented to the user. Next to each strategy is listed corresponding information about average payout, maximum payout, and minimum payout for the respective strategy.

In some embodiments, the user may pay for any information that is listed about strategies. For example, the user may pay one cent per handle pull to have expected payout information listed next to potential strategies. Alternatively, the user might decide to buy information only after an intermediate outcome has been generated and appears on the screen of the user's gaming device. Of course, the gaming device could offer one or more opportunities for the player to purchase any such supplementary information at any time during a player's gaming session.

In some embodiments, the user may enter one or more preferences relating to the presentation of strategies. In some embodiments, for example, the user might begin gaming session by going through a survey. In the survey, the gaming device asks the user about a number of representative hands. For example, the gaming device might ask the user what he would do if he held A(s), 10(d), 8(d), 5(h), 2(c). If the user says he would employ two possible strategies, then the gaming device might follow up by asking the user how much he would allocate to each strategy. The gaming device might also ask in what order the user would like the strategies listed. Questions related to displaying strategies may include (but are not limited to) the following subject matter:

How many strategies should be listed for each hand?

How should the strategies be ordered—by average payout, by maximum payout, etc.?

What supplementary information should be presented with each strategy—average payout, maximum payout, etc.?

How should strategy choices be presented—by the use of underlines beneath certain card combinations, by having the hand replicated with only certain cards held, etc.?

If you have a preferred strategy or strategies on record for a particular type of hand, should the strategy(ies) be executed automatically for you when that type of hand occurs?

Should the presentation of strategies change based on earlier outcomes?

Should strategies with higher minimum payouts (e.g., safer strategies) be listed first after you have lost on three outcomes in a row?

There are many well-known ways for a user to describe preferences to the gaming device other than through the use of a survey. For example, the user might navigate a set of menus on the screen of the gaming device. One menu might provide choices for the number of strategies to be shown to a user. Another menu might present choices for how strategies should be ordered. Other menus might give other choices. In other embodiments, the user might simply enter text describing how he would like strategies presented to him.

The representation of player database 400 depicted in FIG. 4 contains exemplary entries describing strategies preferred by users. The strategies indicated in player database 400 as preferred may, for example, be listed ahead of other strategies, or otherwise given priority.

In some embodiments, the user may describe his preferred strategies and may authorize the gaming device or the casino server to execute the strategies for him automatically. In these embodiments, the user may further enter preferences as to how the gaming device should choose strategies for the user based on the outcomes of prior handle pulls. For instance, if the user has recently won a large payout, the user may wish to press his luck and may wish for the gaming device to pursue strategies with high maximum payouts. If the user has been on a losing streak, then the user may wish simply to break the losing streak with any winning outcome at all. Therefore, during a losing streak, the user may wish for the gaming device to pursue safe strategies, such as those that guarantee a payout.

The user may also enter preferences for the automatic execution of strategies based on the outcome of prior strategies during the current handle pull. For instance, a user holds A(s), K(d), Q(h), J(c), J(d). Based on previously entered user preferences, the gaming device automatically pursues a strategy of discarding only the J(d), aiming for a 10 in order to make a straight. The gaming device risks half of the user's original wager on the strategy. If the strategy does result in a winning outcome for the user, then user preferences might indicate that the gaming device should pursue the same strategy again, now risking the second half of the user's original wager. However, if the strategy does not result in a winning outcome for the user, then user preferences may direct the gaming device to pursue a different strategy with the second half of the user's original wager. For example, if the first strategy has failed, the gaming device now risks the second half of the user's original wager on holding the J(c) and the J(d) only.

Any preferences the player has entered may be linked to the player via a player identifier, such as a player tracking card number. For example, as illustrated in player database 400, a player's preferred strategies are associated with a player identifier stored, in some embodiments, by the casino server. In such embodiments, when a player inserts his tracking card into the card reader of a gaming device, the gaming device may communicate the tracking card number to the casino server. The casino server may then identify the player's preferences by looking up the tracking card number in the player database, and retrieving the associated preferences. The casino server may then transmit these preferences back to the gaming device. The gaming device may then make use of the preferences in a number of ways described herein and apparent to those of ordinary skill in the art, including displaying potential strategies according to player preferences, or executing strategies automatically according to player preferences.

Of course, many other types of player preferences may be stored in association with the player identifier (e.g., player tracking card number). Additionally, many other player identifiers may be used in place of, or in addition to, the player tracking card number. For example, a password, fingerprint, retinal scan, voice print, or DNA sequence may all serve as player identifiers.

4.4. Determine One or More Secondary Outcomes Based on One or More Play Options

A user's selected strategy indicates to the gaming device how to determine or generate a secondary outcome based on the intermediate outcome. Some examples are provided below.

In some video poker embodiments, the user selects one or more discards from a five-card video poker hand (e.g., accepts or requests a draw combination). The gaming device then generates a secondary outcome by replacing the discards defined by the draw combination with new cards, for example, from the top of an internally stored electronic deck of cards. In some slot machine embodiments, a user gains entry into a bonus round and selects one of three doors to open in order to reveal a secret prize. The gaming device then generates the secondary outcome by displaying a picture of the door ajar with the prize revealed behind it.

In some video blackjack embodiments, a user chooses to stand. The gaming device then generates the secondary outcome by revealing the dealer's hole card, and by dealing additional cards to the dealer from the top of an electronic deck until the dealer's hand meets certain criteria. In some pai gow poker embodiments, a user chooses how to divide his seven-card hand into a five-card and a two-card hand. The dealer's hand is then revealed, and divided into two hands according to predetermined rules.

In some pai gow embodiments, the user chooses how to split his four tiles into two hands. The dealer's tiles are then revealed, and are split into two hands according to predetermined rules. In some exemplary casino war embodiments, the user chooses to go to war. The gaming device (or human dealer) then deals three cards face down to the user and to the dealer, and a single face-up card to the user and to the dealer.

As in determining an intermediate or initial outcome, in order to generate the secondary outcome, the processor of the gaming device may execute a routine to generate one or more random numbers, and may then associate these numbers with particular game symbols, such as cards or reel symbols. These game symbols may then be incorporated into secondary outcome. In some embodiments, the gaming device need generate no new random numbers, as the gaming device will only be required to deal the top card(s) from a deck, or to reveal some other random outcome that has already been determined.

In some embodiments, secondary outcomes stemming from all of the user's strategies are generated all at once. For example, if a video poker player has one strategy involving holding only the 5(d), 6(d), and 7(d), and one strategy involving holding only the 10(c), and 10(s), then the user may see his final two hands simultaneously. For instance: 5(d), 6(d), 7(d), K(h), A(s); and 10(c), 10(s), 2(h), J(d), 10(h). In other embodiments, the user may see secondary outcomes sequentially.

In some embodiments, the outcomes of two strategies are generated using the same deck of cards. In other embodiments, the outcomes of two strategies are generated using copies of the same deck of cards. In still other embodiments, different decks of cards are used. To illustrate, suppose a video poker player holds J(s) 10(h), 9(h), 8(h), 3(c). The player chooses two strategies. With the first strategy, the player holds only the J(s), 10(h), 9(h), and 8(h). In the second strategy, the player holds only the 10(h), 9(h), and 8(h). Furthermore, suppose that the next three cards in the deck are Q(s), 7(h), 6(h), though these cards are unknown to the player. Now in one embodiment, where the same deck is used, the first strategy is resolved with the Q(s) replacing the 3(c), and the second strategy is resolved with the 7(h) and 6(h) replacing the J(s) and the 3(c). The player ends up with Q(s), J(s), 10(h), 9(h), 8(h) in one hand, and 10(h), 9(h), 8(h), 7(h), 6(h) in the other hand. In the embodiment were copies of the same decks are used, the first strategy is resolved with the Q(s) replacing the 3(c), and the second strategy is resolved with the Q(s) and 7(h) replacing the J(s) and the 3(c). The player ends up with Q(s), J(s), 10(h), 9(h), 8(h), in one hand, and 10(h), 9(h), 8(h), Q(s), 7(h) in the other hand. In embodiments where two different decks are used, the first hand may be resolved with the Q(s) replacing the 3(c). The second hand may be resolved, say, with the 9(d) and the A(s) replacing the J(s) and the 3(c). The player ends up with Q(s), J(s), 10(h), 9(h), 8(h), in one hand, and 10(h), 9(h), 8(h), 9(d), A(s) in the other hand. In this last embodiment, each deck that is used may have the player's initial five cards removed. That is, each deck may lack the J(s), 10(h), 9(h), 8(h), and 3(c).

In some embodiments of the present invention, after determining one or more secondary outcomes, the gaming device determines which of the determined secondary are winning outcomes. Accordingly, in some embodiments, the gaming device stores a table describing all winning outcomes. The gaming device may then compare each of the user's outcomes to outcomes stored in the table. Any of the user's outcomes that match an outcome stored in the table is a winning outcome.

In other embodiments, the gaming device stores a program that analyzes the user's outcomes, and determines whether the user's outcomes meet the criteria of a winning outcome. For instance, the processor of the gaming device executes a program to determine whether all cards in a user's hand are of the same suit, whether all cards in a user's hand are of consecutive ranks (e.g. K, Q, J, 10, 9), whether the user's hand contains four cards of a like rank, and so on. If the program finds that all cards in a user's hand are of consecutive ranks, but not of like suits, then the program determines that the user's hand meets the criteria of a straight. In some cases, a user's outcome may meet the criteria of multiple winning outcomes. For instance, in poker variants involving seven-card hands, a user might hold both a flush and a pair. The gaming device might then determine the highest-paying winning outcome whose criteria the user's hand meets. There are many other ways by which the gaming device determines which of the secondary outcomes are winning outcomes.

In some embodiments, the gaming device determines the payout for a winning outcome by searching an internal database (not shown) in which payouts are stored as a function of outcome and wager size. For example, if the user has allocated fifty cents to a strategy that has resulted in the outcome of a straight, then the gaming device looks up the payout corresponding to a straight and a fifty-cent wager. In some embodiments, the payout is represented internally as a function of the wager size. For instance, the payout for a straight may be four times the wager size. Accordingly, to determine the payout for a straight with a fifty-cent wager, the processor of the gaming device multiplies fifty cents by four to get $2.00. Other ways of determining the payout are possible and will be well known to those of ordinary skill in the art. In some embodiments, payouts may be rounded to the nearest whole cent, nearest denomination of ten cents, nearest token denomination, etc.

The payout for a secondary outcome may occur immediately after the secondary outcome has been generated. Alternatively, the payout for a secondary outcome may be made only after all secondary outcomes for a particular handle pull have been generated. Then, payouts from each secondary outcome for the handle pull may be lumped together into a single payout, and given to the user all at once.

As is well-known in the art, any distributed zero or non-zero payouts may be added to a user's credits on the gaming device, may be deposited immediately into the user's tray, or may be given to the user in the form of a ticket, receipt, or other indication of winnings. A user may take a ticket or receipt to a desk at a casino to receive the cash he is due. In some embodiments, payouts may comprise merchandise. Merchandise may be brought to the user at his gaming device, brought to the user's hotel room, or sent to the user's home address. Payouts may also be awarded in the form of comp points; discounts on meals, shows, hotel rooms, or transportation; stamps; phone minutes; lottery tickets, and so on.

According to some embodiments of the present invention, once the user has chosen more than one strategy, the user may or must divide an initial wager among the chosen strategies. For example, a user begins with a $1 wager, and is dealt the intermediate outcome of: K(d), K(h), Q(h), J(h), 9(h). The user now chooses two strategies. In the first strategy, the user holds only the K(d), and the K(h). In the second strategy, the user holds only the K(h), Q(h), and J(h). The user decides now to allocate sixty cents of his original wager to the first strategy, and forty cents to the second. When the secondary outcomes are generated, the user will be paid in proportion to the amount of money he allocated to the corresponding strategy. Suppose then that the first strategy results in a secondary outcome of K(d), K(h), K(s), 10(d), 7(s). The payout for this outcome on a $1 wager is $3. However, since the user has allocated only sixty cents to this strategy, his payout for this outcome is ($0.60/$1)*$3, or $1.80. Now suppose also that the second strategy results in a secondary outcome of K(h), Q(h), J(h), 10(d), 9(c), whose payout on a $1 wager is $4. Since the user has allocated only forty cents to this strategy, he receives $0.40/$1*$4, or $1.60. The user's total payout for the handle pull is therefore: $1.80+$1.60=$3.40.

In one or more embodiments, an indication of the user's allocation to one or more selected strategies may be indicated on a display screen of the gaming device is listed. The indication may describe, for example, a number of dollars allocated, a number of tokens allocated, or a percentage of the original wager that has been allocated.

For instance, one exemplary strategy may be listed as: A(h), K(h), X, X, X. This strategy means that the user will hold the A(h) and K(h) and draw three new cards. Next to the strategy appears a dollar figure: $2. The dollar figure indicates that the user will allocate $2 of his original wager towards the strategy of holding only the A(h) and the K(h). The dollar figure could appear to the left or to the right of the description of the strategy, above or below the description, or in any other relative position. Rather than "$2" appearing beside the strategy, "20%" might appear, assuming the user's original wager was $10.

An indication of a wager allocation need not be text. For example, two coin symbols might appear by a strategy to indicate that a user has allocated $2 to that strategy. As another example, a description of a strategy might have a border that is colored or shaded to represent the amount being allocated to that strategy. For instance, a strategy with a white border may indicate that no amount is allocated to it. A strategy with a black border may indicate that the user's full original wager allocated to it. A strategy bordered in gray may indicate that a fraction of the user's original wager is allocated to it. Other ways of indicating information about a wager allocation will be described herein, and others may be apparent to those of ordinary skill in the art.

In some embodiments, each listed strategy on a display screen, for example, may be sequentially brought into focus. For instance, a particular strategy is highlighted, underlined, made to flash, made bold, made large, etc. A strategy may be brought into focus by the user if, for example, the user touches the description of the strategy on the display screen, or presses a numeric button on his gaming device corresponding to the strategy. Alternatively, the strategy may be brought into focus by the gaming device.

In one or more embodiments, when a strategy is in focus, the user has the opportunity to allocate a portion of his original wager to that strategy. To do so, the user may have one or more options, examples of several of which are described below.

Arrows. Arrows may appear on the display screen or as plastic buttons on the gaming device. Exemplary arrows would include an up arrow and a down arrow. The user can press the up arrow to increase the size of his allocation to a particular strategy, and the down arrow to decrease his allocation to a particular strategy. The arrows may cause the allocation amount to increase or decrease in predefined increments, which may correspond to the smallest denomination of coin or token the gaming device handles. Other words or symbols could easily substitute for the arrow symbols. For instance, the text pairs "up" and "down", "more" and "less", "increase" and "decrease", "add 10%" and "subtract 10%", could be used in place of the arrows.

Figure 16:
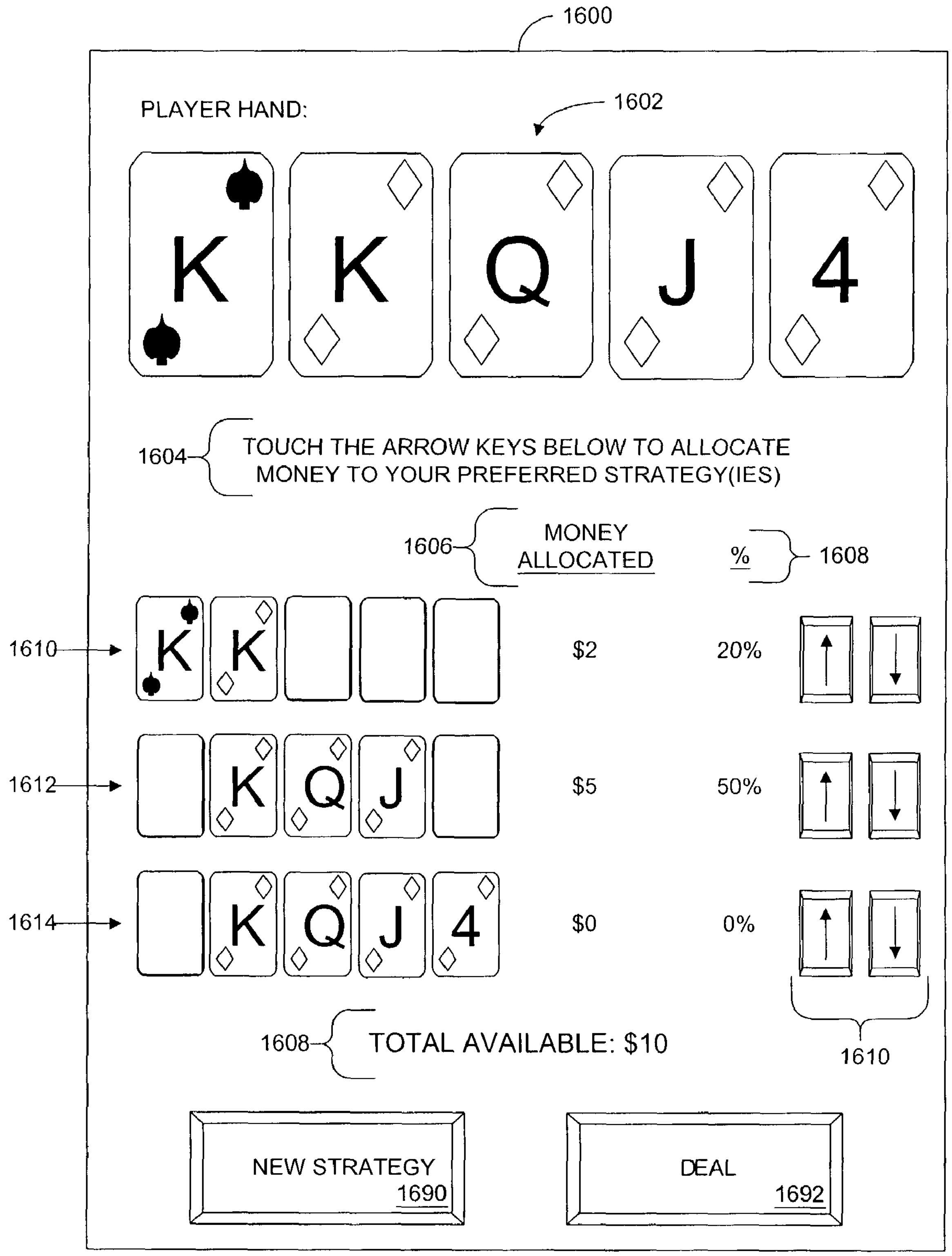
FIG. 16 is a drawing illustrating an example of a ninth gaming device display screen as it may be used on a gaming device 108 according to some embodiments of the present invention.

FIG. 16 depicts an example display 1600 depicting a representation of one or more arrows 1610 at a gaming device. In some embodiments, there are no particular symbols for incrementing or decrementing an allocation amount. Instead, the user may touch the description of a strategy displayed at the gaming device. Touching the description may cause the user's allocation amount for that strategy to increment (or alternatively to decrement).

Numeric keys. In some embodiments, numeric keys may be provided on a display screen or as plastic buttons. The user may use the numeric keys to key in a dollar figure, number of tokens, or percentage describing the amount to be allocated to the strategy currently in focus.

Menus. In some embodiments, the user may choose the size of an allocation from a menu on the display screen of his gaming device, or from a menu embodied in plastic buttons on his gaming device. The menu may contain standardized allocation amounts such as $1, $2, $3 . . . ; or 1 token, 2 tokens 3 tokens . . . ; or 10%, 20%, 30% . . . . The menu may also contain an "Other" option with which the user might input an allocation amount using, for example, a keypad.

Figure 17:
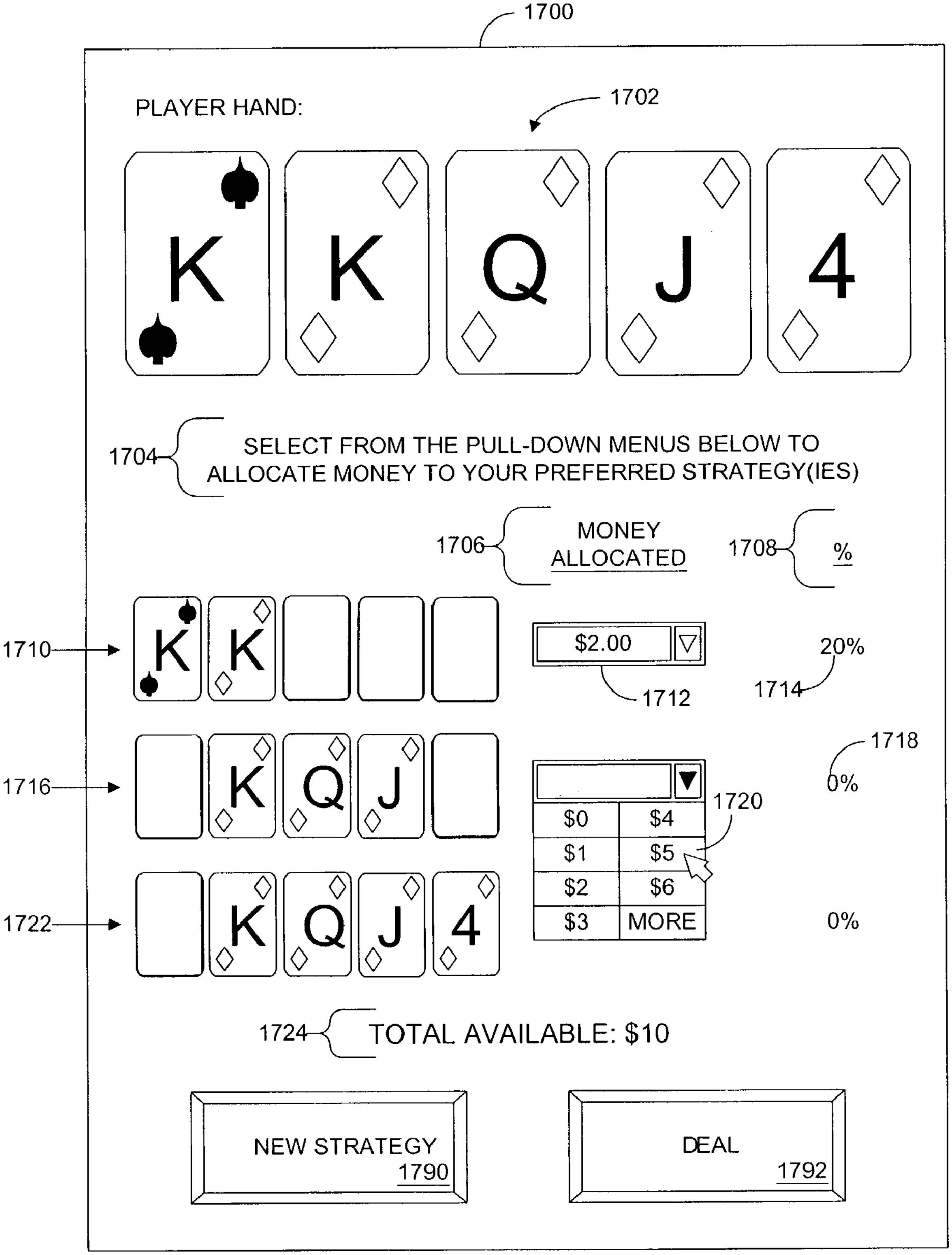
FIG. 17 is a drawing illustrating an example of a tenth gaming device display screen as it may be used on a gaming device 108 according to some embodiments of the present invention.

FIG. 17 depicts an example display 1700 depicting a representation of one or more menus displayed at a gaming device. Menu 1712 indicates that $2.00 has been allocated to a draw combination 1710, percentage allocation 1714 indicates that the $2.00 is 20% of an initial wager. As depicted in FIG. 17, a user is in the process of selecting an allocated amount of $5 by selecting a menu item 1720. The display 1700 also includes an indication of the total available wager 1724.

Coin symbols. The user's gaming device may display symbols of coins representing the user's original wager. The symbols may all begin, for example, at the top of the display screen. The user may then drag one or more coins from the top of the display screen to an area corresponding to a particular strategy. To drag a coin, the user may trace a path with his finger along the display screen of a gaming device. The user may also employ a mouse if, for example, the user is at a personal computer. By placing a coin symbol beside a particular strategy, the user indicates he wishes to allocate a portion of his wager, corresponding to the value of the coin, to the strategy. Of course, other symbols may be used instead of coins. Symbols depicting paper currency, diamonds, gold bars, dollar signs, and so on, may be used.

Audio. According to one or more embodiments, the user may voice allocation amounts into the microphone of a gaming device. The processor of the gaming device may then execute a speech recognition program to recognize the allocation amount. The gaming device may then display the allocation amount on the display screen. The user may also use voice over a telephone connection, or voice over an Internet connection. For example, the user may speak into a phone that is connected to a voice response unit run by the casino server. The voice response unit may interpret and then confirm the user's allocation amount.

Coin slots. According to some embodiments, the user may allocate money to a particular strategy by inserting one or more coins into a coin slot corresponding to the strategy. For example, if the user wishes to allocate fifty cents to the third listed strategy, the user may insert two quarters into the third coin slot of the gaming device (e.g. as measured left to right). However, the coins need not constitute the user's allocation. Instead, the coins inserted into the coin slots may simply indicate to which strategy a wager that has already been placed should be allocated. For example, a user might insert a quarter into the third slot of a gaming device to indicate that $1 of his original wager should be allocated to the third strategy. The user may later receive the quarter back from the gaming device, or the quarter may be added to the user's credits stored on the gaming device.

In some embodiments where the quarter does constitute the user's actual monetary allocation, the gaming device must be careful that a user does not refuse to insert money under unfavorable circumstances. For instance, the user may receive a bad intermediate outcome, and may refuse to insert coins because he doesn't think he will win with any strategy stemming from the intermediate outcome. One solution is to require the user to insert a certain amount of money at the beginning of a gaming session, the money acting similar to a security deposit. If a user ever refuses to allocate money to any strategies, then the gaming device may deduct money from the user's security deposit.

In some embodiments, the gaming device may also select an allocation amount for a particular strategy automatically. The allocation amount may be such that all the strategies selected by the user receive an equal allocation. Alternatively, the gaming device may select allocation amounts for the user based on the user's playing history. If, for example, the user always allocates 50% of his original wager to the strategy with the highest expected payout, and then divides the remainder of his money among the other chosen strategies, then the gaming device may employ the same scheme for the current outcome. Other relevant statistics from the user's playing history may include the following:

What percentage of an original wager does a user typically allocate to a flush draw when holding a high pair and three cards to a flush?

How much money does a user typically allocate to an inside straight draw when also holding a high pair?

How many tokens does a user typically allocate to a strategy of drawing three cards to a royal-flush?

According to one or more embodiments of the present invention, the gaming device or casino server may set some limits on how much the user can allocate to each or any of his chosen strategies. In some embodiments, the user must allocate his original wager equally among all chosen strategies. For instance, if the user chooses two strategies, then half his wager must go to each. If the user chooses three strategies, then one-third of his wager must go to each.

In other embodiments, the user must allocate a wager equally among all chosen strategies subject to rounding constraints. For example, a user's original wager is $1, and the user wishes to choose three strategies. If the user were to allocate exactly one-third of his original wager to each of the strategies, then the user would have to allocate thirty-three and one-third cents of his wager to each strategy. However, a gaming device is not necessarily equipped to handle wagers denominated in fractions of a cent, or even in cents. Therefore, the user may be required to allocate thirty-three cents to one of the strategies, thirty-three cents to another of the strategies, and thirty-four cents to the third strategy. The gaming device might instead require wager allocations in ten-cent denominations, in which case the user might be required to make allocations of thirty cents, thirty cents, and forty cents. Note that an allocation of 20-40-40 might not be allowed, if the allocations must be as nearly equal as possible subject only to the constraints of being multiples of ten cents. If the user is restricted to twenty-five cent denominations, for example, he may make allocations of twenty-five cents, twenty-five cents, and fifty cents.

In some embodiments, the user need not make equal allocations (or near equal allocations) to all strategies. However, the user may still be required to make allocations in specified increments. For example, a user's allocations must be in twenty-five-cent denominations. In this case, a user would be able to choose two strategies and to allocate twenty-five cents to one and seventy-five cents to the other.

In some embodiments, there is a minimum amount that a user must allocate to any chosen strategy. The minimum amount might be specified in monetary terms or in percentage terms. For example, a user might be constrained to allocate at least five cents to a given strategy, or he may be constrained to allocate at least 5% of his original wager to the strategy. In some cases, the user must allocate at least the greater of five cents or 5% of his wager to a given strategy.

Similarly, in some embodiments there may be a maximum amount a user is able to allocate to a given strategy. A user may be constrained not to allocate more than ninety cents to a given strategy. The user may be constrained not to allocate more than 90% of his original wager. The user may be constrained not to allocate more than the lesser of ninety cents or 90% of his original wager to a given strategy.

The limits placed on how much may be allocated to a particular strategy may depend on the strategy itself. For example, the gaming device may prevent the user from allocating more than 50% of a wager to an individual strategy with a positive expected payout. However, in some embodiments, the user may be allowed to allocate 30% of a wager to each of two strategies, both with positive expected payouts.

In some embodiments of the present invention, payouts are proportional to the amount of money allocated to a particular strategy. For example, the payout for a royal-flush is described as 800 times the amount wagered. Therefore, if a user allocates $0.25 to a particular strategy, and the strategy results in a royal-flush, then the user receives $0.25*800, or $200.

Figure 18:
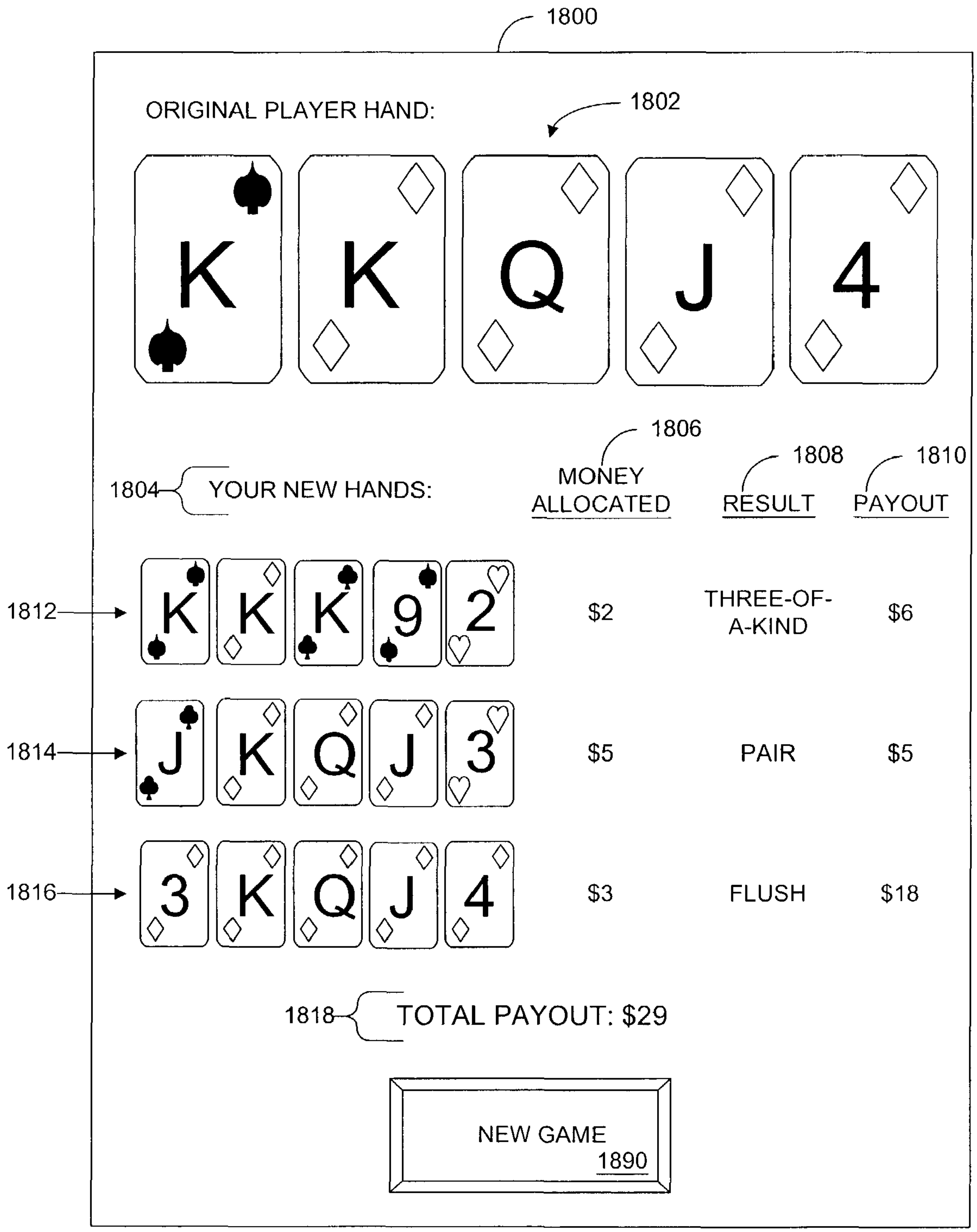
FIG. 18 is a drawing illustrating an example of an eleventh gaming device display screen as it may be used on a gaming device 108 according to some embodiments of the present invention.

FIG. 18 depicts an example display 1800 depicting a representation of determined secondary outcomes 1812, 1814 and 1816. Display 1800 includes various items of information about the play of the intermediate outcome 1802, including: money allocated 1806 to each strategy; result 1808 for each strategy; and payout 1810 based on each strategy, wager allocation, and/or secondary outcome. The display 1800 also includes an indication of the total payout 1818 earned by playing the three draw combinations.

In some embodiments, a user may allocate such a small amount of money to a particular strategy, that even a winning outcome cannot be paid off using standard currency or token denominations. For example, a video poker player allocates 1 cent to a strategy, and obtains three-of-a-kind, for a payout of 3 cents. Since the user's device does not handle pennies, or penny tokens, the user may be paid in the form of an alternate prize. Alternate prizes may include phone minutes, frequent flyer miles, stamps, comp points, and video clips. Alternatively, small-denomination winnings may be stored as credits on the user's gaming device. When the user receives his credit balance in the form of tokens or currency at the end of a gaming session, the user may then receive an alternate prize in exchange for any portion of the credit balance that cannot be paid in currency. For instance, if a user has $20.23 at the end of a gaming session, he may receive $20 in currency and 100 comp points. Still another alternative is for any portion of a balance that cannot be paid with standard currency or tokens to be rounded either up or down.

In some embodiments discussed herein, the user is able to enter strategy preference information, so that the gaming device might automatically select strategies for the user and might thereby automatically generate a secondary outcome without any input from the user. Similarly, the user may enter preferences as to how money is to be allocated amongst several strategies. For example, one user preference states that whenever a user has a single high card (jack or higher) and an otherwise undistinguished hand (i.e. no pairs, no four-card straights, etc.) the gaming device is to select two strategies for the user. The first strategy is to hold only the high card, and the second strategy is to discard everything. Furthermore, the user preference indicates that 60% of the user's original wager is to be allocated to the first strategy, and 40% of the user's original wager is to be allocated to the second strategy.

User preferences may specify how the user's wager should be allocated amongst various strategies in dependence on the outcomes of prior handle pulls. For instance, given a hand similar to K(s), K(d), Q(d), J(d), 4(h), the user may always choose two strategies: hold the high pair only, and hold the three cards to the royal-flush only. If the user is on a winning streak, then the user may prefer to risk 80% of his original wager on the potentially higher paying strategy of holding the three cards to the royal-flush. If the user is on a losing streak, the user may prefer allocating 80% of his original wager to the sure-to-pay strategy of holding the high pair. So, although the user's choice of strategies may be the same, the user's allocation of money between several strategies may depend on what has happened previously in the user's gaming session, or even before.

User preferences may also specify how the user's wager should be allocated amongst various strategies in dependence on the outcomes of prior strategies during the current handle pull. For example, the user holds K(s), K(d), Q(d), J(d), 4(h). The gaming device proceeds with the strategy of holding the K(s) and K(d), allocating 20% of the user's wager to the strategy. In one embodiment, once the secondary outcome has been generated, the 20% of the user's original wager cannot be used again. The user may be paid immediately based on the secondary outcome, or the user may be paid after the resolution of other strategies stemming from the same intermediate outcome. Now, if the strategy of holding only the two kings results in an improvement to the user's initial hand, e.g. K(s), K(d), 8(h), 8(s), 3(d), then the gaming device may allocate another 60% of the user's original wager to the same strategy. It should be noted, however, that even though the strategy is the same, the result would most likely not be the same. For example, the user might now end up with K(s), K(d), K(h), 3(s), 3(d). The remaining 20% of the user's original wager may then be allocated to the strategy of holding only K(d), Q(d) and J(d). Had the first secondary outcome generated by the gaming device (what turned out to be K(s), K(d), 8(h), 8(s), 3(d)) not resulted in an improvement to the user's hand, then the gaming device may have proceeded to allocate the remaining 80% of the user's original wager to the strategy of holding only the K(d), Q(d), and J(d).

Figure 19:
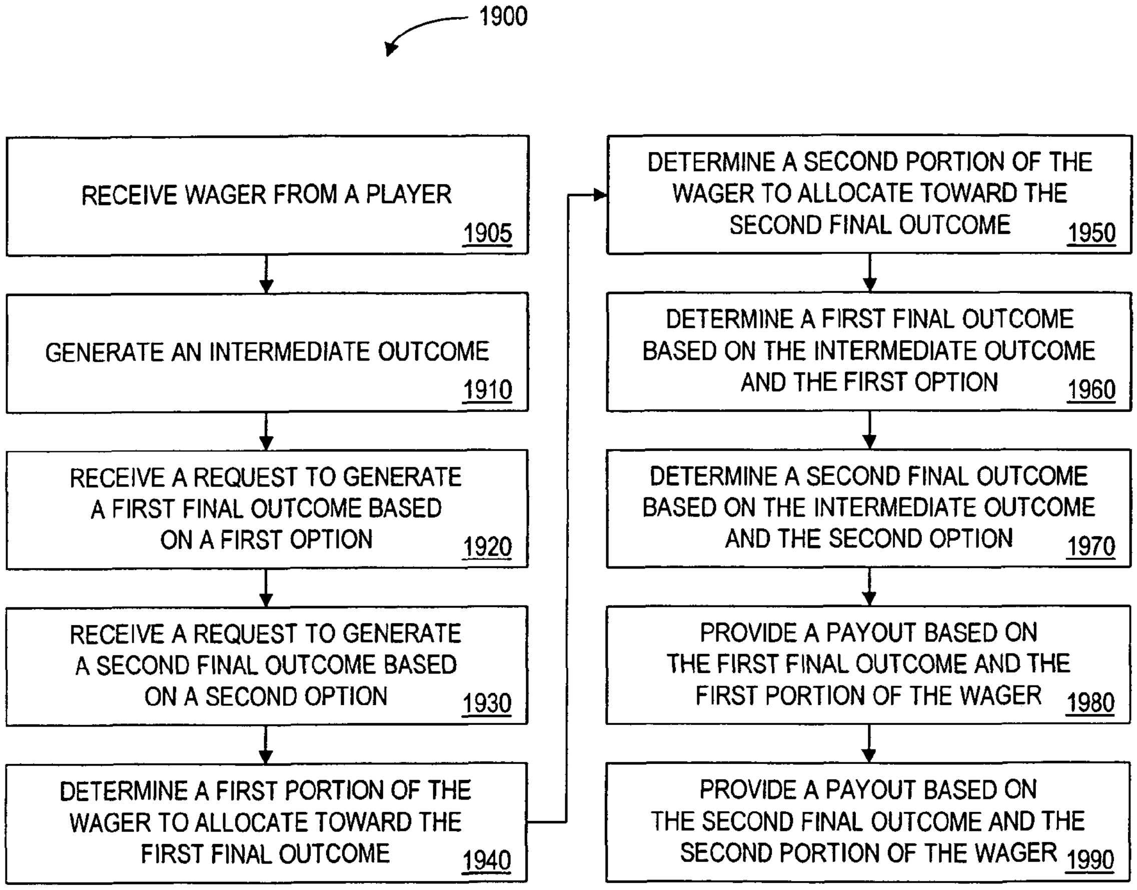
FIG. 19 is a flow diagram illustrating an exemplary process for facilitating play of a gaming device for use in some embodiments of the present invention.

FIGS. 19-23 are flow charts depicting some exemplary embodiments of the present invention. Referring to FIG. 19, a flow chart 1900 represents some embodiments of the present invention that may be performed by a server, such as a casino server or a Web server, and/or by a gaming device including, without limitation, a video blackjack machine and a video poker machine. A gaming device, for example, receives a wager from a player (1905). The gaming device also determines an intermediate outcome (step 1910). For example, in a video blackjack game, the gaming device may generate and display an initial hand of two cards. The gaming device also receives a request or instruction to generate a first final outcome based on a first option (step 1920) and receives a request or instruction to generate a second final outcome based on a second option (step 1930). For example, in a video poker game, the gaming device may receive a request or instruction from a player to hold a first set of cards of an initial hand of cards when generating a final hand. In another example, the gaming device receives an indication that the user has requested an option for play by selecting a button or menu item corresponding to the particular option.

The gaming device determines or receives an indication of a first portion of the initial wager to allocate toward the requested first final outcome (step 1940). The gaming device also determines or receives an indication of a second portion of the initial wager to allocate toward the requested second final outcome (step 1950). The gaming device then determines, receives, or generates a first final outcome based on the intermediate outcome and the first option (step 1960), and also determines a second final outcome based on the intermediate outcome and the second option (step 1970). For example, in a video poker game, a first final outcome may include any cards held according to the first draw combination, and may further include a number of cards, as necessary, used to replace any cards not held (e.g., cards discarded from the initial hand) in order to complete a final hand (e.g., a final hand of five cards in a draw poker game). A payout is provided based on the first final outcome and the first portion of the wager (step 1980), and a payout is provided based on the second final outcome and the second portion of the wager (step 1990).

In some embodiments, rather than indicating or providing payouts separately for different final outcomes, a total payout amount may be provided that is based on all of (or some of) the final outcomes and their respective allocated portions of the initial wager.

Figure 20:
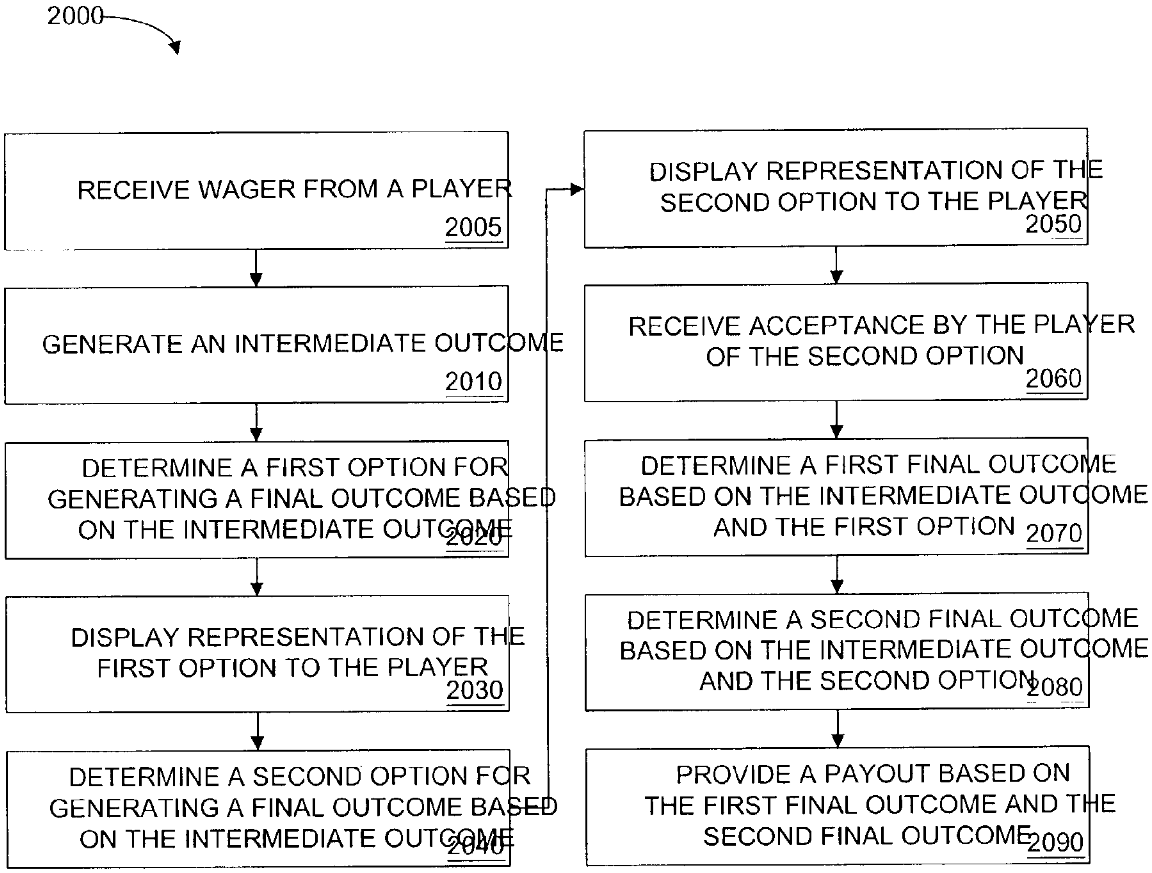
FIG. 20 is a flow diagram illustrating an exemplary process for facilitating play of a gaming device for use in some embodiments of the present invention.

Referring to FIG. 20, a flow chart 2000 represents some embodiments of the present invention that may be performed by a gaming device and/or server. The gaming device receives a wager from a player (2005) and determines an intermediate outcome (step 2010). The gaming device also determines a first option for generating a final outcome based on the intermediate outcome (step 2020), and displays some representation of this first option to the player (step 2030). The gaming device then receives an indication of acceptance or selection by the player of the first option or strategy (2040). The gaming device further determines a second option for generating a final outcome (step 2050), displays a representation of the second option to the player (step 2060), and receives an indication of acceptance of the second option by the player (step 2070).

After receiving the acceptances or selections of the first and second options, the gaming device determines a first final outcome based on the first option (step 2080) and determines a second final outcome based on the second option (step 2090). Finally, the gaming device provides a payout based on the determined final outcomes (step 2095).

Figure 21:
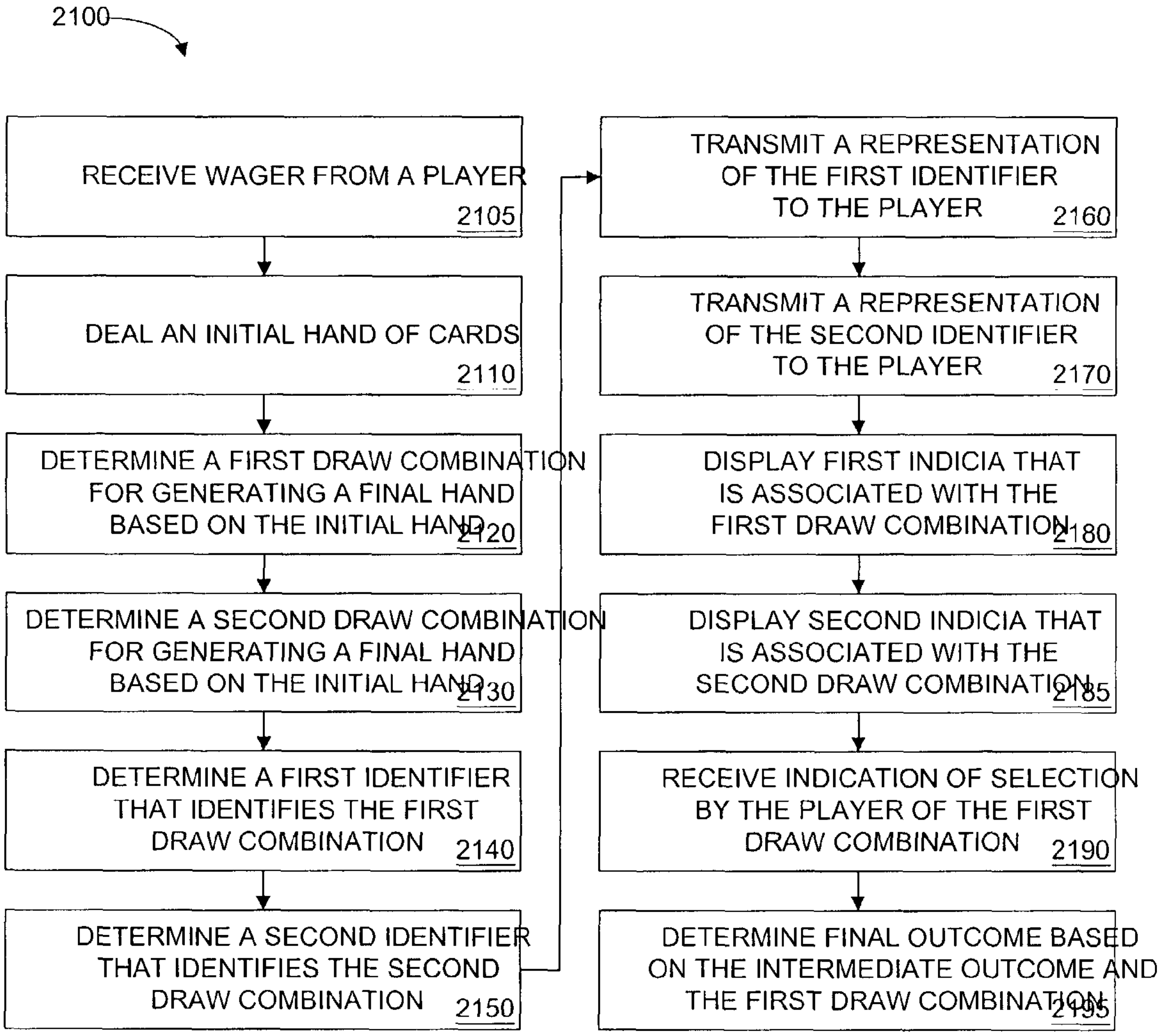
FIG. 21 is a flow diagram illustrating an exemplary process for facilitating play of a gaming device for use in some embodiments of the present invention.

Referring to FIG. 21, a flow chart 2100 represents some embodiments of the present invention that may be performed by a gaming device and/or server. The gaming device receives a wager from a player (2105) and deals an initial hand of cards (step 2121). The gaming device also determines a first draw combination for generating a final hand of cards based on the initial hand (step 2120), and determines an identifier that identifies the first draw combination (step 2130). The gaming device further determines a second draw combination for generating a final hand of cards (step 2140), and also determines an identifier that identifies the second draw combination (step 2150).

The gaming device then transmits a representation of the first identifier to the player (step 2160), and also transmits a representation of the second identifier to the player (step 2170). In addition, the gaming device displays a graphic, control, or indicia at the gaming device that is associated with the first draw combination (step 2180), and also displays a graphic, control, or indicia at the gaming device that is associated with the second draw combination (step 2185). Finally, the gaming device receives an indication of acceptance or selection by the player of a draw combination (step 2190) and determines final outcome based on the selected draw combination (step 2195).

Figure 22:
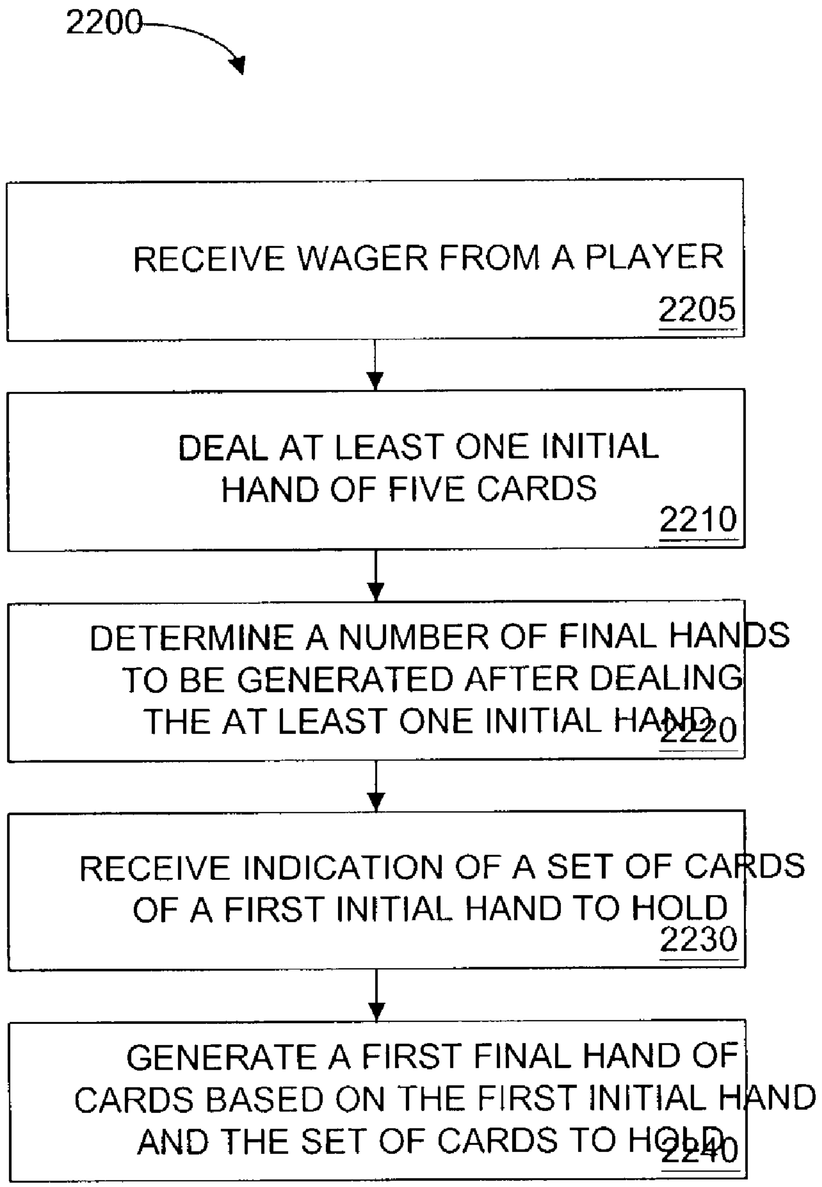
FIG. 22 is a flow diagram illustrating an exemplary process for facilitating play of a gaming device for use in some embodiments of the present invention.

Referring to FIG. 22, a flow chart 2200 represents some embodiments of the present invention that may be performed by a gaming device and/or server. The gaming device receives a wager from a player (2205) and deals one or more initial hands of cards (step 2210). After dealing the at least one initial hand, the gaming device then determines a number of final hands to be generated (step 2220). The gaming device receives an indication of a set of cards to hold in at least one of the initial hands (step 2230), and then generates a final hand of cards based on the at least one initial hand and the selected set of cards to hold (step 2240). Thus, a player may be able to select a number of hands that the player wishes to play based on the intermediate outcome after first seeing the intermediate outcome. In other embodiments, the gaming device may limit the player to playing a certain number of hands after the intermediate outcome is determined (e.g., if the ability for the player to play multiple plays or strategies for the hand would result in an expected payout that is too high).

In some embodiments of the present invention, a user chooses a target outcome, such as a secondary outcome or a set of secondary outcomes to pursue. The choice of secondary outcomes to pursue may constitute a user's strategy, or may occur in addition to a user's choice of strategies. For example, once a video poker player has been dealt an intermediate outcome, the player may decide to go either "high" or "low". A choice of "low" might indicate that the player wins with a hand of: 2, 3, 4, 5, 7 (not suited), or the worst possible hand in many versions of poker. A winning low outcome might include other possible hands, such as: A, 2, 3, 4, 6, or A, 2, 3, 4, 5. A choice of "high" might indicate that the user wins with any typical winning poker hand, such as a pair, two-pair, full-house, flush, etc. In many embodiments, if the user chooses "low", and achieves a winning "high" poker hand, then the user does not win. For example, if the user goes "low", but achieves a full-house, then the user does not win anything. If the user chooses "high", and gets a 2, 3, 4, 5, 7, the user does not win anything.

Even after the user chooses high or low, the user may make additional decisions, such as what card combinations to hold. In some embodiments, the user may pursue two strategies in which he holds two different combinations of cards stemming from the same intermediate outcome. For one strategy, the user may go "high" and for the other strategy, the user may go "low". The user might even wish to hold the same combination of cards for a strategy in which he goes "high", and a strategy in which he goes "low".

When a user chooses a set of secondary outcomes to pursue, he is also preventing himself from winning should outcomes outside the set of secondary outcomes occur. For instance, when a user chooses to go "low", he is preventing himself from winning should four-of-a-kind, or two-pair occur. This is in contrast to a user who goes high and chooses a strategy where he is most likely to get one outcome, but gets another instead. For instance, a player holds: J(h), 10(d), 9(c), 8(h), 3(s). The player goes "high" and then chooses to discard only the 3(s), aiming for a straight. However, the user draws a J(d), achieving a pair (jacks or better). Even though the user was not primarily aiming for a pair, the user still wins, since both a pair and a straight are among the "high" outcomes.

In some embodiments, the user need not declare "high" or "low", but may win upon the occurrence of either. Alternatively, the user may declare both "high" and "low", with the same effect. In this case, the pay tables for all winning outcomes may be reduced, since the user is now more likely to achieve some winning outcome. Also, the user need not declare "high" or "low" only after the intermediate outcome has been generated. The user might declare before the intermediate outcome has been dealt. In fact, the payout table may be higher for a user who declares "high" or "low" before an intermediate outcome has been generated than for a user who declares afterwards. This is because after an intermediate outcome has been generated, the user has better information with which to declare, and so is more likely to win with the proper declaration.

In some embodiments, a user declares one or more outcomes he hopes to achieve. The gaming device then chooses a strategy for the user that is most likely to achieve the designated outcome(s). For instance, the user is dealt the following hand: 7(h), 7(s), 6(d), 5(c), 4(c). The user might declare that he wishes to aim for a straight. Based on the user's declaration, the gaming device might then select a strategy for the user of discarding the 7(h), whereupon the user will have the opportunity to draw an 8 or a 3 and achieve a straight. Had the user declared that he wished to achieve three-of-a-kind, the gaming device might have selected a strategy for the user of discarding the 6(d), 5(c), and 4(c).

Figure 23:
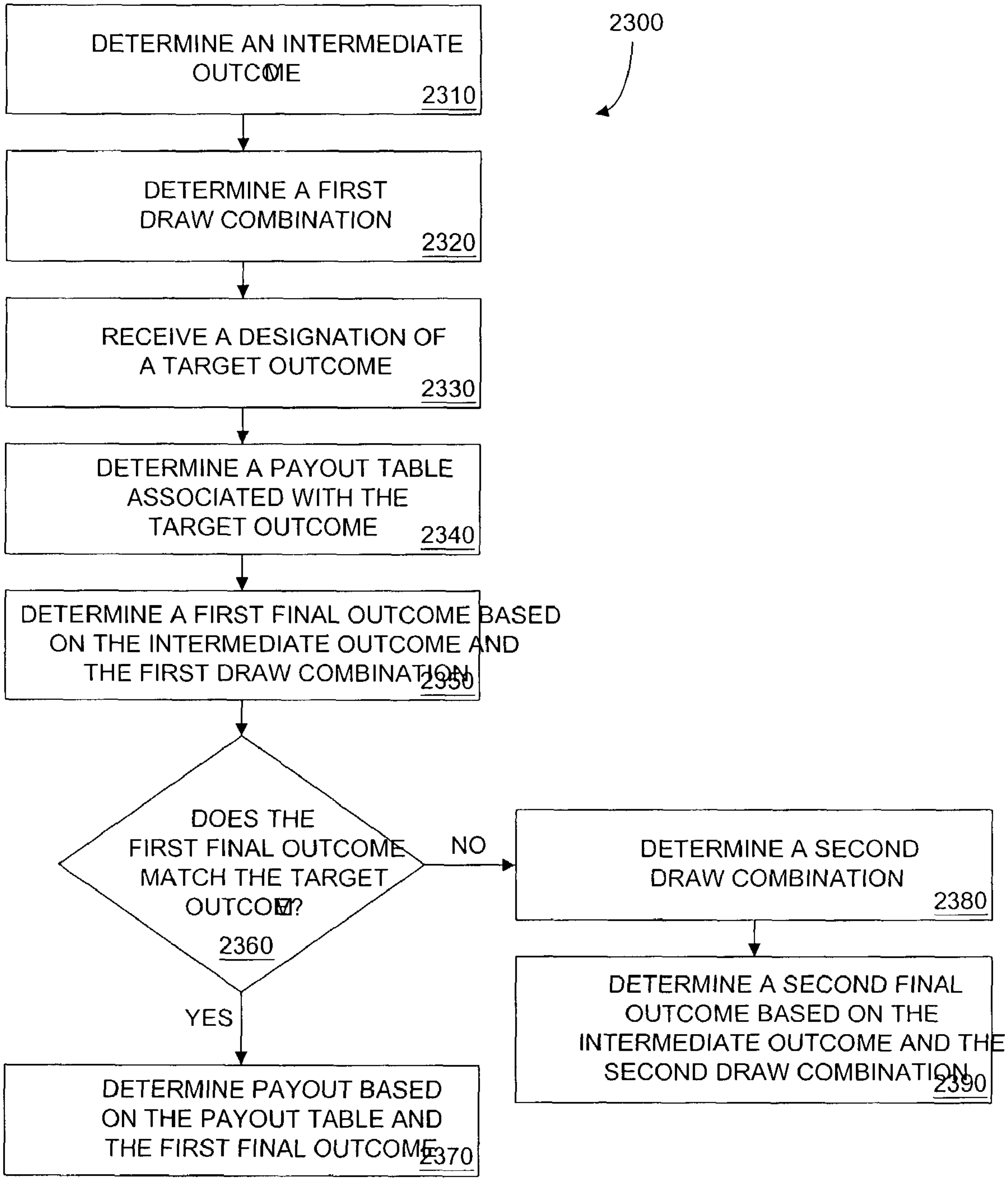
FIG. 23 is a flow diagram illustrating an exemplary process for facilitating play of a gaming device for use in some embodiments of the present invention.

Referring to FIG. 23, a flow chart 2300 represents some embodiments of the present invention that may be performed by a gaming device and/or a server. The gaming device receives an indication of a wager by a player (step 2305), determines an intermediate outcome (step 2310), and also determines a first play option (step 2320). In addition, the gaming device determines a target outcome (step 2330) and a payout table (step 2340). The target outcome is usually but not always determined by receiving an indication of a designation of the target outcome by a player. The payout table is preferably, but not necessarily, based on the target outcome. The gaming device determines a first final outcome based on the intermediate outcome and the first play option (step 2350)

and then determines whether the first final outcome matches the target outcome (step 2360). If the secondary outcome matches the target outcome, a payout is determined and/or provided to the player (e.g., by adjusting a credit balance) based on the payout table and the first final outcome (step 2370). The gaming device also determines a second play option (step 2380) and determines a second final outcome based on the intermediate outcome and the second draw combination (step 2390).

5. Additional Embodiments

The following are several examples that illustrate additional embodiments of the present invention. These examples do not constitute a definition of all possible embodiments, and those skilled in the art will understand that the present invention is applicable to many other embodiments. Further, although the following examples are briefly described for clarity, those skilled in the art will understand how to make any changes, if necessary, to the above-described apparatus and methods to accommodate these and other embodiments and applications.

In some embodiments, prior to seeing one or more outcomes, the user may change his mind about the allocation of his wager among various strategies. For instance, a user may have allocated $1 to the strategy of holding only the 5(d), 6(d), and 7(d), and $1 to holding only the 10(c) and 10(s). After seeing the secondary outcome for the first strategy (5(d), 6(d), 7(d), K(h), A(s)), the user may be disappointed that he didn't get his straight-flush, and may wish to try again. The user still has $1 at risk. But rather than maintaining the full $1 on the strategy of holding only the 10(c), and 10(s), the user can decide to put 50 cents on the strategy of holding the 5(d), 6(d), and 7(d), and 50 cents on the strategy of holding the 10(c), and 10(s). The gaming device might then generate a new secondary outcome using the first strategy, e.g., 5(d), 6(d), 7(d), 8(h), 9(s). Then, the gaming device generates a secondary outcome using the second strategy, e.g., 10(c), 10(s), K(h), K(d), 9(s).

In some embodiments, when the gaming device generates a secondary outcome, the user's wager is still not resolved. In other words, it is still uncertain whether the user will win, or whether he will lose the money he had allocated to the corresponding strategy. For example, in a game of blackjack, one strategy might involve hitting. The gaming device then generates a secondary outcome that consists of the user's original hand plus a new card dealt from the top of an electronic deck. If the user has not busted, then the user may make further decisions, including hitting again or standing. From the secondary outcome, the user may simply make decisions until his bet is resolved. However, the user may once again employ the present invention to make two or more simultaneous decisions from the same secondary outcome. Once again, the user may allocate available money to the two or more new decisions.

The following example illustrates this process. A blackjack player makes an initial wager of $5 and is dealt a starting hand of 10, 2. The dealer shows a 2. The blackjack player then chooses two strategies, "strategy H" to hit, and "strategy S" to stand. He allocates $2 to strategy H, and $3 to strategy S. Going forward with strategy H, the player is dealt an Ace, and his hand has become 10, 2, A. From this hand, the player again chooses two strategies. One strategy, "strategy HH" is to hit. The second strategy, "strategy HS" is to stand. Of the $2 the player had allocated to strategy H, the player allocates $1 to strategy HH, and $1 to strategy HS. The user thus has his original $5 wager allocated as follows: $1 to strategy HH, $1 to strategy HS, and $3 to strategy S. Moving forward with strategy HH, the player is dealt an 8, and now holds 10, 2, A, 8. The player then stands on strategy HH. Now, for each of the three strategies, the dealer's hole card is revealed, and the dealer goes through a series of decisions to generate his final hand. The dealer ends up with 2, 9, 8 for strategy HH; 2, 9, 5, 8 (bust) for strategy HS; and 2, 9, 7, for strategy S. Therefore, the user wins $1 for strategy HH, wins $1 for strategy HS, and loses his $3 for strategy S, for a net loss of $1.

In some embodiments, the user may add to his original wager (make an "added wager") after the intermediate outcome has been generated. The user may then allocate his original wager plus the added wager to his chosen strategies. For example, a user begins with a $1 wager, and is dealt the intermediate outcome of: K(d), K(h), Q(h), J(h), 9(h). The user now makes an added wager of $1, giving him $2 total to allocate. The user might then allocate $1.50 to the strategy of holding only the K(d) and the K(h), and $0.50 to the strategy of holding only the K(h), Q(h), and J(h).

From the casino's perspective, there are drawbacks to allowing a user to make an added wager after the intermediate outcome has been generated. A savvy user might make an added wager only when a favorable intermediate outcome has been generated, guaranteeing the user a positive expected return on the added wager. The ability of a user to make an added wager, and to receive a positive expected return on the added wager, might render a game unprofitable for the casino.

Therefore, the gaming device might enforce restrictions on any added wagers. The following are possible restrictions:

- A user may place an added wager, but only if the expected payout stemming from the best possible strategy would be less than any amount allocated to that strategy.
- A user may place an added wager, but may not allocate any more than the original wager to strategies with positive expected returns.
- A user may place an added wager, but may be charged a fee for doing so. For instance, suppose an available strategy has an expected return for the user of 5%, i.e. $1.05 in expected payout for every $1 wagered. The gaming device may therefore charge the user $0.10 for the privilege of placing an added wager of $1. The user's expectation from the $1 added wagers is therefore: −$1−$0.10+$1.05=−$0.05. The casino thereby maintains an expected profit even while allowing a user to add to his original wager.
- A user may place an added wager, but may only add a limited amount. For example, the user may only add 50% of the original wager, or the user may only add up to 50 cents. In this way, even though the casino might lose money when a user places an added wager, the casino restricts its losses, and may still end up with a net expected profit when the user's original wager is considered.
- Only select users may be given the privilege of making an added wager. For example, a user who wagers more than $10,000 per day may be permitted to make added wagers twice per hour.
- A user may place an added wager, but in doing so may cause the payout table to change. For instance, suppose a user holds the intermediate outcome of K(h), Q(h), J(h), 10(h), 4(d). With best play, the user will discard the 4(d) and draw a new card. Of the remaining 47 cards, 1 will give the user a royal-flush (the A(h)), 1 will give the user a simple straight-flush (the 9(h)), 7 will give the user a simple flush, 6 will give the user a simple straight, and 9 will give the user a pair, jacks or better. The corresponding payouts are, respectively, 800, 50, 6, 4, and 1 times the amount wagered, on a 9/6 Jacks or Better™ video poker machine. The expected payout for one dollar wagered is thus:

$$
\begin{aligned}
EV &= EV \text{ royal-flush} + EV \text{ straight-flush} + EV \text{ flush} + EV \text{ straight} + EV \text{ pair} \\
&= 1/47 * \$800 + 1/47 * \$50 + 7/47 * \$6 + 6/47 * \$4 + 9/47 * \$1 \\
&\approx \$19.68
\end{aligned}
$$

Therefore, if a user could place a $1 added wager, and could allocate the added dollar to the strategy of discarding only the 4(d), then the user would have an expected return on his added wager of $19.68−$1=$18.68. Suppose that the user's original wager had also been $1. If the user allocates the original wager to the strategy of discarding only the 4(d), then his expected payout from the original wager is $19.68. So given the opportunity to add to his original wager, the user's total expected profit is $18.68+$19.68=$38.36. (The reason the two terms on the left side of the equation are not the same is that the original wager is already a sunk cost, whereas looking forward, the user must spend an additional dollar to gain the additional $19.68 in expected payout. Thus, looking forward, the user's expected profit on his added wager is only $18.68, versus $19.68 for the original wager.) As a result of the added wager, the gaming device may reduce the payout for the royal-flush from 800 to 360 times the amount wagered (including both the original amount wagered and the added wager). The user now has $2 at risk and has an expected payout as follows:

$$
\begin{aligned}
EV &= EV \text{ royal-flush} + EV \text{ straight-flush} + EV \text{ flush} + EV \text{ straight} + EV \text{ pair} \\
&= 1/47 * \$2 * 360 + 1/47 * \$2 * 50 + 7/47 * \$2 * 6 + 6/47 * \$2 * 4 + 9/47 * \$2 * 1 \\
&\approx \$20.64
\end{aligned}
$$

Therefore, accounting for the cost of making the added wager ($1), the user's expected profit is $20.64−$1=$19.64. Without the added wager, the user's expected profit is $19.68. Therefore, the change in the payout table has served to make the user almost indifferent to making the added wager, and has ensured that an added wager of $1 will not be expected to cost the casino money.

In the above example, when a user made an added wager, the payout table changed for both the original wager and for the added wager. An alternative would be for the gaming device to change the payout table only for the added wager. Suppose that in the above example, the payout table for the added wager is changed from 800, 50, 6, 4, 1 to 18, 8, 2, 1, 0 for the royal-flush, straight-flush, flush, straight, and pair (jacks or better), respectively. If the user allocates the added wager to the strategy of discarding only the 4(d), then the expected payout for the added wager is:

$$
\begin{aligned}
EV &= EV \text{ royal-flush} + EV \text{ straight-flush} + EV \text{ flush} + EV \text{ straight} + EV \text{ pair} \\
&= 1/47 * \$18 + 1/47 * \$8 + 7/47 * \$2 + 6/47 * \$1 + 9/47 * \$0 \\
&\approx \$0.98
\end{aligned}
$$

Therefore, the user's expected profit on the added wager is $0.98−$1=−$0.02, and the casino once again expects to make money on the added wager. Of course, the user may try other strategies, including strategies for achieving four-of-a-kind, a full-house, three-of-a-kind, or two-pair. However, given the user's intermediate outcome of K(h), Q(h), J(h), 10(h), 4(d), the objectives of these strategies will be difficult to meet, since all require multiple cards of like ranks. Therefore, the payouts for four-of-a-kind, a full-house, three-of-a-kind, and two-pair, need not be reduced for the added wager. In fact, the payouts for four-of-a-kind, a full-house, three-of-a-kind, and two-pair may actually be increased for the added wager. This might encourage a player to place an added wager and to pursue these outcomes, even though doing so might still result in a profit for the casino.

In a related example, one or more payouts for an added wager are eliminated. In one of the above examples, the payout table for the added wager was changed from 800, 50, 6, 4, 1 to 18, 8, 2, 1, 0 for the royal-flush, straight-flush, flush, straight, and pair (jacks or better), respectively. Eliminating the payout for a pair (jacks or better) altogether would have an equivalent effect to setting the payout to zero.

These embodiments may have one drawback in that a user who is intent on maximizing his expected payout will always choose just one strategy, the strategy with the highest expected payout per dollar wagered, and will allocate all of his money there.

However, payouts need not be proportional to the amount allocated to a particular strategy. The following are several examples of how the payout for a secondary outcome may depend on the amount allocated to the strategy that results in the secondary outcome:

The payout, in dollars, is equal to the square of the number or dollars allocated. For example, $3 is paid $9, and $5 is paid $25

The payout, in dollars, is equal to the square root of the number of dollars allocated. For example, \$4 is paid \$2, and \$100 is paid \$10

The payout, in dollars, is equal to two raised to the power of the number of dollars allocated. For example, \$2 pays $2^2$ dollars, or \$4, and \$3 pays $2^3$ dollars, or \$8

The following example illustrates how these non-proportional payouts may cause a user intent on maximizing his expected payout to allocate money to multiple strategies, even when a given amount allocated to a first strategy has a lower expected return than the same amount allocated to a second strategy.

Suppose that in a hypothetical game, a user makes an initial wager of \$10, and then receives an intermediate outcome. From the intermediate outcome there are only two possible strategies, denoted "strategy 1" and "strategy 2". Both strategies allow for the possibility of achieving just one winning outcome. The winning outcome is the same for both strategies, and pays according to the following formula: $P=\$50-\frac{1}{2}(A-\$10)^2(\$1)^{-1}$. In the formula, "P" is the payout for achieving the winning outcome, and "A" is the amount that the user has allocated to the strategy that achieved the winning outcome. Although the formula may seem complicated, it embodies a number of familiar aspects. Examination of the formula reveals that the more a user allocates to a strategy, up to \$10, the more he will be paid if the winning outcome occurs. If the user allocates \$0 to a strategy, then he receives $P=\$50-\frac{1}{2}(\$0-\$10)^2(\$1)^{-1}=\$50-\$50=\$0$, if winning outcome occurs. If the user allocates \$10 to a strategy, then he receives $P=\$50-\frac{1}{2}(\$10-\$10)^2(\$1)^{-1}=\$50-\$0=\$50$, if the winning outcome occurs. Below is a table showing payouts for a winning outcome given some sample allocations:

| 0 | 1 | 2 | 3 | 4 | 5 | 6 | 7 | 8 | 9 | 10 |
|---|---|---|---|---|---|---|---|---|---|---|
| 0 | 9.50 | 18 | 25.50 | 32 | 37.5 | 42 | 45.5 | 48 | 49.5 | 50 |

Now suppose that the probability of the winning outcome occurring using strategy 1 is ¼, and the probability of the winning outcome occurring using strategy 2 is ½. How is the user to maximize his expected payout through the strategic allocation of his original wager amongst the two possible strategies?

To begin with, let A1 be the amount of money the user allocates to strategy 1, and let P1, be the amount the user will be paid should strategy 1 result in a winning outcome. Similarly, A2 is the amount of money the user allocates to strategy 2, and P2 is the amount the user will be paid if strategy 2 results in a winning outcome. Then, because of the nature of the payouts, the following equations hold:

$$P1=\$50-\tfrac{1}{2}(A1-\$10)^2(\$1)^{-1}$$

$$P2=\$50-\tfrac{1}{2}(A2-\$10)^2(\$1)^{-1}$$

Furthermore, since the user has made an original wager of only \$10, the following constraint holds:

$$A1+A2=\$10$$

The expected payout to the user, denoted "E", is equal to the sum of the payouts for the two strategies, each multiplied by its probability of occurring. Thus:

$$\begin{aligned} E &= \frac{1}{4}P1 + \frac{1}{2}P2 \\ &= \frac{1}{4}\left(\$50 - \frac{1}{2}(A1 - \$10)^2(\$1)^{-1}\right) + \frac{1}{2}\left(\$50 - \frac{1}{2}(A2 - \$10)^2(\$1)^{-1}\right) \end{aligned}$$

In the above equation, \$10−A1 is substituted for A2 to yield:

$$\begin{aligned} E &= \frac{1}{4}\left(\$50 - \frac{1}{2}(A1 - \$10)^2(\$1)^{-1}\right) + \frac{1}{2}\left(\$50 - \frac{1}{2}(\$10 - A1 - \$10)^2(\$1)^{-1}\right) \\ &= \frac{1}{4}\left(\$50 - \frac{1}{2}(A1^2 - \$20A1 + (\$10)^2)(\$1)^{-1}\right) + \frac{1}{2}\left(\$50 - \frac{1}{2}A1^2(\$1)^{-1}\right) \\ &= \frac{1}{4}\$50 - \frac{1}{8}A1^2(\$1)^{-1} + \frac{1}{8}\$20A1(\$1)^{-1} - \frac{1}{8}(\$10)^2(\$1)^{-1} + \$25 - \frac{1}{4}A1^2(\$1)^{-1} \\ &= \$25/2 - \frac{3}{8}A1^2(\$1)^{-1} + 5/2A1 - \$25/2 + \$25 \\ &= -\frac{3}{8}A1^2(\$1)^{-1} + 5/2A1 + \$25 \end{aligned}$$

Now, E is differentiated twice with respect to A1. The derivative of E will be denoted E', and the second derivative of E will be denoted E".

$$E'=-\tfrac{3}{4}A1(\$1)^{-1}+5/2$$

$$E''=-\tfrac{3}{4}(\$1)^{-1}$$

Now, a potential maximum is found in E as a function of A1 by setting E' to zero.

$$E'=0$$

$$-\tfrac{3}{4}A1(\$1)^{-1}+5/2=0$$

$$-\tfrac{3}{4}A1(\$1)^{-1}=-5/2$$

$$A1(\$1)^{-1}=10/3$$

$$A1=\$10/3$$

$$\approx\$3.33$$

Since E" is everywhere a negative quantity (of inverse dollars), the function E is everywhere concave down, and therefore E is maximized at A1=\$10/3. A user would therefore maximize his expected payout by allocating approxi mately $3.33 to the first strategy, and $6.67 to the second strategy. The expected payout would then be:

$$\begin{aligned} E &= -\frac{3}{8}AI^2(\$1)^{-1} + 5/2AI + \$25 \\ &= -\frac{3}{8}(\$10/3)^2(\$1)^{-1} + 5/2(\$10/3) + \$25 \\ &= -\$25/6 + \$25/3 + \$25 \\ &= \$175/6 \\ &\approx \$29.17 \end{aligned}$$

Had the user allocated all of his money to the second strategy, his expected payout would have been $25.

The example illustrates several points. Both strategies aim for the same winning secondary outcome, and the second strategy is twice as likely as the first to achieve the winning secondary outcome. However, the most beneficial allocation (in terms of expected payout) is not to put the full $10 into the second strategy, but to put some money into the first strategy and some into the second. A game may therefore take on an added dimension, requiring the user not only to look for the best strategy, but also to consider lesser strategies, and to consider the relationships of all the strategies to one another. Although the above example considered a simplified hypothetical game, the same concept may be applied to video poker and to other games found in a casino. That is, payouts need not be proportional to an amount wagered, with the implication that a user might be encouraged to choose multiple strategies in order to maximize an expected return.

In some embodiments, the user may test one or more strategies before actually allocating money to them. For instance, the user obtains an intermediate outcome, and the gaming device presents the user with three possible strategies with which to proceed. The user then asks the gaming device to generate sample secondary outcomes stemming from each of the strategies. The user does not yet, however, risk any money on the strategies. Once the sample secondary outcomes have been generated, the user may decide which of the strategies to pursue, and how much money to allocate to each strategy. The user's choice may be influenced by the sample secondary outcomes. For example, if the user sees that the second strategy has resulted in a favorable sample secondary outcome, then the user may weight his monetary allocation most heavily towards the second strategy.

The disclosed invention may apply to many other games besides those typically found in casinos. For example, in a chess game between a player and a computer, the player may be undecided between two possible strategies. The computer may then create a second display of a chessboard next to the first, and may set up the same position on the second board as is currently on the first. The player and the computer may then complete chess games on both boards. On the first board, the player may pursue one strategy, and on the second board the player may pursue another. Rather than allocating money to one strategy or the other, the player may allocate rating points, or points in a tournament. For example, in a typical chess tournament, a player receives one point for winning a game, a half-point for drawing, and nothing for losing. If a game is split into two games, then a player may receive a half-point for winning one of the games, a quarter point for drawing one of the games, and nothing for losing one of the games. Then, the total number of points to be won between both of the games is still one point.

A player may be allowed to allocate money to a particular strategy, or even to make an added wager, provided the player performs one or more specified activities. Exemplary activities may include:

Using another gaming device

Allocating money to a different strategy as well

A user may be required to specify at the start of a handle pull (i.e. before seeing the intermediate outcome) whether or not he would like to use multiple different strategies stemming from the intermediate outcome. The gaming device may then configure itself to display multiple strategies, versus using a standard display with only one possible strategy. The gaming device might also alter its pay table. For example, the gaming device may make the pay table more favorable to the user if the user specifies that he will use multiple strategies. The gaming device can do this because one of the user's strategies will likely be sub-optimal, preventing the user from taking full advantage of the improved pay table.

The use of one strategy may constrain the user in the use of another strategy. For example, a user might be allowed to discard a particular card only once in any strategy. Therefore, if a user discards the fourth and fifth cards using one strategy, then the user cannot pursue another strategy where he discards the first four cards, since he has already discarded the fourth card in the first strategy. In another exemplary embodiment, the user is only able to hold a particular card once in any strategy. Then a user could not hold the first and second cards in one strategy, and the second card in another, since he would be holding the second card in two different strategies.

In some embodiments, the gaming device recognizes similar or equivalent strategies, and provides the user with a choice of only one from a set of similar strategies. For instance, suppose a user holds the 7(h), 7(s), 6(d), 5(c), 4(c). If the user wishes to achieve a straight, then the user might discard the 7(h) and then hope for an 8 or a 3. However, it would be equivalent for the user to discard the 7(s) instead of the 7(h). That is, the user's choice of which seven to discard would have no impact on the probabilities of achieving any of the possible payouts. Therefore, the gaming device might choose to present only one strategy in which a lone 7 is discarded, rather than presenting both strategies to the user. In another situation, the user holds A(s), K(d), 8(h), 6(c), 2(c). With this hand, one possible strategy might be to hold just the A(s). Another possible strategy would be to hold just the K(d). Although the strategies are not exactly equivalent, they both have similar intents. Both strategies seek to hold a single high card, because holding the high card might lead to a pair (jacks or better), and potentially more. In addition, the expected payouts for both strategies are very similar. Therefore, the gaming device might present only one of the two strategies to the user.

In some embodiments, the gaming device may store an intermediate outcome in memory even after the gaming device has generated secondary outcomes stemming from the intermediate outcome, and has paid the user based on the secondary outcomes. Several handle pulls later, the user may decide to come back to the stored intermediate outcome. Perhaps he will try a different strategy this time than he had before. Perhaps he thinks he will be luckier this time than before, or he will repeat his luck from before. The user may, for example, choose from a menu showing the last ten intermediate outcomes. The user may then insert a wager, and have the opportunity to play from the chosen intermediate outcome. If the intermediate outcome has a high expected payout, then the user may be required to insert more than the standard wager for a handle pull, or, alternatively, the potential payouts may be reduced.

In one embodiment a player may allocate a single wager amongst multiple games. For example, a video reel slot machine might feature two different games, one with the theme of exotic cuisine, and one with the theme of cars. A player at the slot machine might insert a quarter and then allocate 15 cents to the cuisine game, and 10 cents to the car game. Suppose that the player then lines up three caviar symbols at the cuisine game, and three sports cars at the car game. The three caviar symbols pay $20 for a quarter wager. So the player now receives 15/25*$20, or $12. The three sports car symbols pay $10. So the player receives 10/25*$10, or $4. The player's total winnings are then $12+$4=$16.

A user may receive increased payouts or bonus payouts if some specified combination of the user's strategies result in winning outcomes. For instance, a user might pursue three different strategies. If all three strategies result in secondary outcomes of a straight or better, the user may receive a bonus payout of $100. The $100 may be paid in addition to, or instead of the payouts for the outcomes themselves. The user may receive a bonus payout if all three strategies lose, or if the first strategy wins and the next two lose, etc.

Providing bonus payouts based on the secondary outcomes of multiple strategies allows for the gaming device to offer very large bonus prizes. This is because the probability of multiple unlikely events occurring simultaneously is typically much less than the probability of each occurring individually. For example suppose a user holds the K(s), K(d), Q(d), J(d), 4(d). The user might follow three different strategies: hold the K(s), K(d); hold the K(d), Q(d), J(d); and hold the K(d), Q(d), J(d), 4(d). As will be shown below, the probability of the first strategy leading to four-of-a-kind is 45/16215, or 0.0028. The probability of the second strategy leading to a royal-flush is 1/1081, or 0.00093. The probability of the third strategy leading to a flush, is 9/47, or 0.19. The probability of all three events occurring simultaneously, assuming each of the secondary outcomes is generated independently, is equal to: $45/16215*1/1081*9/47\approx 5*10^{-7}$, or about one in two million. Therefore, the gaming device might reasonably offer a bonus prize of $10,000 for the simultaneous occurrence of the four-of-a-kind, the royal-flush, and the flush. The expected payout of the bonus prize would then be $\$10{,}000*5*10^{-7}$, about half a cent.

In some embodiments of the present invention, outcomes, including intermediate outcomes, target outcomes, and/or secondary outcomes may be generated based on a random or pseudo-random process (e.g., based on a random number generator of the gaming device). In some embodiments, outcomes may be determined in accordance with one or more payout tables, in a manner well known in the art. In some embodiments, outcomes may be based at least partly on the skill of the player.

In one or more embodiments of the present invention, outcomes may be based at least in part by a selection by a player. For example, the player may indicate a preference for a target outcome or intermediate outcome. Some embodiments provide for determining an outcome in response to a signal from a player. Players, for example, may request the generation of an outcome, or alternatively may indicate a preference for an outcome, by using a player input device of gaming device. For example, the gaming device may receive a signal via a button, a handle, or a touch screen.

Some embodiments provide for determining an outcome after or in response to receiving an indication of a wager by a player. In some alternative embodiments, a primary or target outcome is determined (e.g., generated by a gaming device) before receiving a wager from a player. In some embodiments, outcomes may be determined by the gaming device or by a server automatically.

In some embodiments of the present invention, outcomes (e.g., generated outcomes, indications of preferred outcomes) may be received by a gaming device from a player and/or a server. For example, a gaming device may display a representation of one or more outcomes to a player (e.g., via a menu), and receive an indication of at least one outcome selected by the player.

In some embodiments, outcomes or indications of outcomes may be received by a gaming device via a signal, a computer-readable medium, and/or a computer-readable memory. For example, a player may use a wireless PDA to beam a selection of a target outcome to an appropriately configured gaming device. In another example, an indication of an outcome may be stored on a memory of a player tracking card or other portable memory. In some embodiments, indications of outcomes may be received via a receipt or ticket. For example, a player may have started a session at a first gaming device and established an intermediate outcome and a target outcome, and received one or more secondary or final outcomes. An indication of such outcomes may be output to a player tracking card, or, alternatively, indicated on a printed substrate, such as a gaming receipt. Then, the player may continue a gaming session at a second gaming device, for example, by having the second gaming device read the gaming receipt or the player tracking card.

In some embodiments, outcomes of games of chance may comprise, without limitation, a slot reel, a slot reel symbol, a card, and/or a hand of cards. Other types of game elements or symbols and configurations of such elements are well known in the art. In some embodiments, the intermediate outcome is a losing outcome according to a standard payout table associated with the game of chance. In some embodiments, the intermediate outcome and/or target outcome are predetermined (e.g., by a casino); the player is not given a choice.

An intermediate outcome may be any random or non-random set of information, including, without limitation, a configuration of symbols displayed at a gaming device, or a set of cards that appear face-up and/or face-down at a gaming device. Some exemplary intermediate outcomes are:

A(h), A(s), A(d), J(h), 4(h) (e.g., appearing on a video poker machine)

Dealer: K(s), unknown; Player: 10(d), 2(h) (e.g., appearing on a video blackjack machine)

In some embodiments, an intermediate outcome is generated automatically, without initiation by the player. In one embodiment, the intermediate outcome is always the same outcome (or is always from a predetermined set of outcomes); the player does not get to designate a desired intermediate outcome or have an intermediate outcome generated. For example, the intermediate outcome in a video poker game might always be: K(s), Q(s), J(s), 10(s), 2(d). This intermediate outcome would, advantageously, always invite a player to draw to a royal flush, an exciting outcome in video poker.

In other embodiments, the player chooses the intermediate outcome. The player may, for example, choose to have an initial hand of blackjack be: 9-9. The player then, as desired, would be able to both "stand" on the initial hand and also pursue a "split" with the initial hand.

In many embodiments, the gaming device determines a play option (e.g., draw combination, "stand" in blackjack) based on the intermediate outcome. For example, if the intermediate outcome differs by only one card (or one symbol) from a winning outcome (e.g., in a standard payout table), then the gaming device may anticipate that the player would like to exercise the play option that would result in a final outcome that closely resembles the intermediate outcome. The gaming device may then have the anticipated play option as a default option, subject to change if the player so desires.

For example, for a player holding a hand of J(s), 10(s), 9(s), 8(s), 5(h), in video draw poker, the gaming device may determine target outcomes of any straight, and/or any flush. Thus, the gaming device may determine a draw combination to suggest would be to discard only the 5(h) (holding the other cards). With this draw combination, if the player draws any spade, then he achieves a target outcome of a flush. If the player draws a seven of spades or a queen of spades, then he achieves a straight flush.

In a video poker embodiment, secondary outcomes may be generated from an infinite deck, from a constant deck, or from a diminishing deck. In an infinite deck embodiment, the likelihood of drawing any card (with the possible exception of cards currently in the player's hand) is the same. In a constant deck embodiment, any cards that are discarded are put back into the virtual deck, though possibly only after the next secondary outcome is generated.

The gaming device may perform some or all of the described functions of the server. Similarly, the server may perform some or all of the described functions of the gaming device.

Although the present invention has been described with respect to a preferred embodiment thereof, those skilled in the art will note that various substitutions may be made to those embodiments described herein without departing from the spirit and scope of the present invention.

What is claimed is:

1. A method of operating a gaming device including a memory device storing a plurality of instructions, said method comprising:

(a) receiving a wager from a player using an input device of the gaming device;

(b) subsequent to receiving the wager, causing a processor of the gaming device to execute the plurality of instructions to generate an intermediate outcome;

(c) causing a display device of the gaming device to display a representation of the intermediate outcome to the player;

(d) causing the processor to execute the plurality of instructions to determine a first option for generating a first final outcome based on the intermediate outcome, the first option selectable by the player;

(e) causing the display device to display a representation of the first option to the player;

(f) causing the processor to execute the plurality of instructions to determine a second option for generating a second final outcome based on the intermediate outcome, wherein the second option is selectable by the player and different from the first option;

(g) causing the display device to display a representation of the second option to the player;

(h) causing the processor to execute the plurality of instructions to determine whether the player selected:

(1) the first option for generating the first final outcome;

(2) the second option for generating the second final outcome; or (3) the first option and the second option;

(i) causing the at least one processor to execute the plurality of instructions to:

(1) if the player selected the first option:

(i) subsequent to generating the intermediate outcome and prior to determining any final outcome, determine a first amount of the wager to allocate to the first final outcome;

(ii) generate the first final outcome based on the first option; and (iii) determine a first payout based on the first amount of the wager and the first final outcome (2) if the player selected the second option:

(i) subsequent to generating the intermediate outcome and prior to determining any final outcome, determine a second amount of the wager to allocate to the second final outcome, wherein a sum of the first amount of the wager and the second amount of the wager is not greater than the wager;

(ii) generate the second final outcome based on the second option; and (iii) determine a second payout based on the second amount of the wager and the second final outcome; and (3) determine a total payout amount, wherein the total payout amount is the sum of the first payout and the second payout.

2. A method of operating a gaming device including a memory device storing plurality of instructions, said method comprising:

(a) receiving a wager from a player using an input device of the gaming device;

(b) subsequent to receiving the wager, causing a processor of the gaming device to execute the plurality of instructions to deal an initial hand of cards, the initial hand including at least a first card and a second card;

(c) causing a display device of the gaming device to display the initial hand of cards to the player;

(d) causing the processor to execute the plurality of instructions to determine a first option for generating a first final hand based on the initial hand, wherein the first option comprises holding at least the first card and the first option is selectable by the player;

(e) causing the display device to display a representation of the first option to the player;

(f) causing the at least one processor to execute the plurality of instructions to determine a second option for generating a second final hand based on the initial hand, wherein the second option is different from the first option and the second option is selectable by the player;

(g) causing the display device to display a representation of the second option to the player;

(h) causing the processor to execute the plurality of instructions to determine whether the player selected:

(1) the first option for generating the first final hand;

(2) the second option for generating the second final hand; or (3) the first option and the second option;

(i) causing the at least one processor to execute the plurality of instructions to:

(1) if the player selected the first option:

(i) subsequent to dealing the initial hand of cards and prior to determining any final outcome, determine a first amount of the wager to allocate to the first final hand;

(ii) generate the first final hand based on the first option;

(iii) determine a first payout amount based on the first amount of the wager and the first final outcome (2) if the player selected the second option:

(i) subsequent to dealing the initial hand of cards and prior to dealing any final outcome, determine a second amount of the wager to allocate to the second final hand, wherein a sum of the first amount of the wager and the second amount of the wager is not greater than the wager;

(ii) generate the second final hand based on the second option; and (iii) determine a second payout amount based on the second amount of the wager and the second final outcome; and (3) determine a total payout amount, wherein the total payout amount is the sum of the first payout and the second payout.

3. The method of claim 1, wherein determining the first amount of the wager to allocate to the first final outcome is based on receiving from the player an indication of the first amount of the wager to allocate to the first final outcome.

4. The method of claim 3, wherein determining the second amount of the wager to allocate to the second final outcome is based on receiving from the player an indication of the second amount of the wager to allocate to the second final outcome.

5. The method of claim 2, wherein determining the first amount of the wager to allocate to the first final hand is based on receiving from the player an indication of the first amount of the wager to allocate to the first final hand.

6. The method of claim 5, wherein determining the second amount of the wager to allocate to the second final hand is based on receiving from the player an indication of the second amount of the wager to allocate to the second final hand.

* * * * *

UNITED STATES PATENT AND TRADEMARK OFFICE

CERTIFICATE OF CORRECTION

PATENT NO. : 7,789,743 B2
APPLICATION NO. : 10/298621
DATED : September 7, 2010
INVENTOR(S) : Walker et al.

It is certified that error appears in the above-identified patent and that said Letters Patent is hereby corrected as shown below:

In Claim 1, Column 45, Line 59, replace "the second option;" with --the second option; and--.

In Claim 1, Column 46, Line 2, after "outcome" insert --;--.

In Claim 2, Column 46, Line 47, replace "the second option;" with --the second option; and--.

In Claim 2, Column 46, Lines 55 to 56, replace "the first option;" with --the first option; and--.

In Claim 2, Column 46, Line 58, after "outcome" insert --;--.

Signed and Sealed this

Seventh Day of December, 2010

David J. Kappos

David J. Kappos
*Director of the United States Patent and Trademark Office*